US008781638B2

(12) United States Patent
Rouse et al.

(10) Patent No.: US 8,781,638 B2
(45) Date of Patent: Jul. 15, 2014

(54) CAMPUS ENERGY MANAGER

(71) Applicants: Gregory C. Rouse, Sarasota, FL (US); John F. Kelly, Elmhurst, IL (US)

(72) Inventors: Gregory C. Rouse, Sarasota, FL (US); John F. Kelly, Elmhurst, IL (US)

( * ) Notice: Subject to any disclaimer, the term of this patent is extended or adjusted under 35 U.S.C. 154(b) by 4 days.

(21) Appl. No.: 13/784,495

(22) Filed: Mar. 4, 2013

(65) Prior Publication Data

US 2013/0289787 A1 Oct. 31, 2013

Related U.S. Application Data

(60) Provisional application No. 61/639,850, filed on Apr. 27, 2012.

(51) Int. Cl.

| | |
|---|---|
| ***G05D 3/12*** | (2006.01) |
| ***G05D 5/00*** | (2006.01) |
| ***G05D 9/00*** | (2006.01) |
| ***G05D 11/00*** | (2006.01) |
| ***G05D 17/00*** | (2006.01) |
| ***G06Q 50/06*** | (2012.01) |

(52) U.S. Cl.

CPC ...................................... *G06Q 50/06* (2013.01)
USPC ............ 700/291; 700/286; 700/292; 700/297

(58) Field of Classification Search

CPC ...................................................... G06Q 50/06
USPC .................................. 700/286, 291, 292, 297
See application file for complete search history.

(56) References Cited

U.S. PATENT DOCUMENTS

| | | | | |
|---|---|---|---|---|
| 6,882,904 | B1 | 4/2005 | Petrie et al. | |
| 7,081,684 | B2 | 7/2006 | Patel et al. | |
| 7,116,010 | B2 | 10/2006 | Lasseter et al. | |
| 7,531,915 | B2 | 5/2009 | Wang et al. | |
| 7,656,059 | B2 | 2/2010 | Wang et al. | |
| 7,787,272 | B2 | 8/2010 | Lasseter et al. | |
| 7,834,479 | B2 | 11/2010 | Capp et al. | |
| 7,983,799 | B2 | 7/2011 | Bose et al. | |
| 8,583,520 | B1 * | 11/2013 | Forbes, Jr. | 705/34 |
| 8,706,583 | B1 * | 4/2014 | Forbes, Jr. | 705/34 |
| 2002/0036430 | A1 | 3/2002 | Welches et al. | |
| 2002/0198629 | A1 * | 12/2002 | Ellis | 700/286 |
| 2004/0030457 | A1 | 2/2004 | Bayoumi et al. | |
| 2008/0172312 | A1 * | 7/2008 | Synesiou et al. | 705/34 |
| 2009/0072624 | A1 | 3/2009 | Towada | |
| 2010/0145536 | A1 | 6/2010 | Masters et al. | |
| 2010/0179704 | A1 | 7/2010 | Ozog | |
| 2010/0198421 | A1 | 8/2010 | Fahimi et al. | |
| 2010/0274407 | A1 | 10/2010 | Creed | |

(Continued)

OTHER PUBLICATIONS

L. Roggia et al "Design of a Sustainable Residential Microgrid System Including PHEV and Energy Storage Device" Proceedings of the 2011—14th European Conference on Power Electronics and Applications (EPE 2011), Issue Date : Aug. 30, 2011-Sep. 1, 2011, pp. 1-9.

(Continued)

*Primary Examiner* — Mohammad Ali
*Assistant Examiner* — Ziaul Karim
(74) *Attorney, Agent, or Firm* — Paul D. Chancellor; Ocean Law

(57) ABSTRACT

An energy management system serves an arbitrary collection of loads via interfacing with related field devices and external information sources and responding to events including pricing events, demand response events, and carbon reduction events by managing the loads and local generation.

27 Claims, 28 Drawing Sheets

(56) References Cited

U.S. PATENT DOCUMENTS

| | | | | |
|---|---|---|---|---|
| 2010/0292853 | A1 | 11/2010 | McDonnell | |
| 2011/0082596 | A1 | 4/2011 | Meagher et al. | |
| 2011/0093127 | A1 | 4/2011 | Kaplan | |
| 2011/0106321 | A1 | 5/2011 | Cherian et al. | |
| 2011/0270452 | A1* | 11/2011 | Lu | 700/291 |
| 2012/0065805 | A1* | 3/2012 | Montalvo | 700/297 |

OTHER PUBLICATIONS

F. Katiraei et al "Micro-Grid Autonomous Operation During and Subsequent to Islanding Process" IEEE Transactions on Power Delivery, vol. 20, No. 1, Jan. 2005, pp. 248-257.

C. Cho et al "Active Synchronizing Control of a Microgrid" IEEE Transactions on Power Electronics, vol. PP, Issue: 99, p. 1, Jul. 21, 2011.

R. Lasseter et al "Microgrid: A Conceptual Solution" IEEE Power Electronics Specialists Conference, 2004, Conf. 35; vol. 6, pp. 4285-4291.

R. Lasseter et al "Autonomous Control of Microgrids" IEEE PES Meeting, Montreal, Jun. 2006.

G. Celli et al "Optimal participation of a microgrid to the energy market with an intelligent EMS" The 7th International Power Engineering Conference, 2005. IPEC 2005. Issue Date: Nov. 29, 2005-Dec. 2, 2005.

T. Overbye et al "Visualizing the Electric Grid." IEE Spectrum, 2001, vol. 38; Part 2, pp. 52-59.

A. Nourai et al "Batteries Included" IEEE Power & Energy Magazine. Mar./Apr. 2010. pp. 49-54.

C. Chen et al "Design of Parallel Inverters for Smooth Mode Transfer Microgrid Applications" IEEE Transactions on Power Electronics, vol. 25, No. 1, Jan. 2010. pp. 6-15.

E. Sortomme et al "Fault Analysis and Protection of a Microgrid" Power Symposium, 2008. NAPS '08. 40th North American. Issue Date: Sep. 28-30, 2008.

John Kelly et al "Mesa del Sol a Path to Perfect Power Final Report" Galvin Electricity Initiative, Dec. 6, 2007.

John F. Kelly et al "IIT Perfect Power Prototype Final Report" Galvin Electricity Initiative, Oct. 15, 2007.

Angela Chuang et al Master Controller Requirements Specification for Perfect Power Systems, Galvin Electricity Initiative, Nov. 15, 2006.

* cited by examiner

| ITEM | TYPICAL OF |
|---|---|
| 1202 | distribution breaker |
| 1204 | substation bus tie breaker |
| 1206 | utility tie breaker |
| 1208, 1213 | cross tie breakers |
| 1210 | generator breaker |
| 1212 | substation supply breaker |

CAMPUS ENERGY MANAGER

PRIORITY CLAIM

This application claims the benefit of U.S. Provisional Patent Application No. 61/639,850 filed Apr. 27, 2012 which is incorporated herein in its entirety and for all purposes.

BACKGROUND OF THE INVENTION

1. Field of the Invention

The invention relates to systems and processes. In particular, the invention includes a method for managing the supply of electric power.

2. Discussion of the Related Art

Electric power is supplied to residential, commercial, and industrial customers. Managing electric power for a campus, a building, a collection of buildings, and/or a microgrid has received little thought and only small efforts have been made to develop processes and to install electric infrastructure suited to managing such collections of electric consumers.

SUMMARY OF THE INVENTION

The present invention provides a method and system useful for managing arbitrary collections of electric loads such as a campus, a building, a collection of buildings, and/or a microgrid.

In various embodiments, systems implementing one or more methods of the invention serve an arbitrary collection of loads via interfacing with related field devices and/or external information sources. Some embodiments of the invention respond to events including pricing events, demand response events, and carbon reduction events by managing the loads and local generation.

In an embodiment, a campus energy manager system comprises: an energy manager for managing electrical loads; field devices interfacing with campus loads and local generating resources; field devices sensing load related environmental variables; energy manager interface modules including bidirectional interface modules for translating field device data into a common format acceptable to the energy manager; energy manager processing and storage receiving information from field devices via the interface modules; and, energy manager processing and storage issuing commands to field devices via the interface modules.

In an embodiment, a campus energy manager system comprises: a campus of buildings and related electric supply infrastructure; systems and devices external to an energy manager; an interface of the energy manager, the interface including a group of interface modules; the interface configured to exchange data between at least some of the systems and devices and the energy manager; the systems and devices including field devices and internet information sources; the interface including field modules and internet services modules; the energy manager including a processing and storage unit; the processing and storage unit configured to provide data storage, data processing, commands, and reporting; wherein the processing and storage unit utilizes the interface to acquire information relating to electric market pricing events, demand response events, and carbon reduction events; and wherein the processing and storage unit configures the electric infrastructure to respond to at least one of an electric market pricing event, a demand response event, and a carbon reduction event.

In an embodiment, a first campus energy management method comprises the steps of: determining from a plurality of operating modes a particular operating mode; in a demand response operating mode with a requested load reduction RLR, managing by evaluating a potential for building load reduction BLR, if BLR>=RLR then issuing building load reduction command(s), if RLR>BLR then determining if RLR>dispatchable local generation DLG, and if RLR>BLR and if RLR>DLG then issuing building load reduction command(s) and dispatching dispatchable local generation; in a carbon reduction operating mode with a target carbon reduction TCR, managing by determining CO2 reduction from potential load reduction LCR, and if LCR<TCR then reducing carbon production through load reductions and operation of dispatchable local renewable generation; and, in a make or buy operating mode, using indications of make electricity cost M$ and buy electricity cost B$ to dispatch local dispatchable generation where B$>M$ and where this inequality is expected to hold for a time period exceeding a selected minimum local renewable generation run time period.

In an embodiment, the first method further comprises the steps of: controlling a local uninterruptable power supply electric power source (UPS) by determining a state of charge of the UPS, assessing whether the present time is a utility on-peak time and assessing whether the present time is a utility off-peak time, charging the UPS if the present time is an off-peak time and state of charge is not charged, placing the UPS in a standby mode if the present time is an off-peak time and the state of charge is charged, enabling UPS discharge if the present time is an on-peak time and the UPS state of charge is greater than about twenty percent, and charging the UPS if the present time is an on-peak time and the UPS state of charge is not greater than about twenty percent.

In an embodiment, the first method further comprises the steps of: managing the operation of a renewable generation electric power source (RG) by determining allowable voltage variations at one or more selected locations in the campus electric infrastructure, determining allowable frequency variations at one or more selected locations in the campus electric infrastructure, predicting voltage and frequency variations at respective locations in the campus electric infrastructure while the RG is supplying power to the campus electric power distribution system, assessing whether predicted voltage or frequency variations exceed respective allowable values, and where an exceedance is found, discontinuing a plan to use or current use of the RG.

In an embodiment, the first method further comprises the steps of: implementing a reliable campus electric power supply and distribution system by providing at least first and second utility fed electric power substations as a pair of substations, providing local electric power generation with one or more electric power sources interconnected to a generator bus via respective generator breakers, interconnecting the paired substations with the generator bus via respective substation supply breakers, the generator bus and generator breakers also serving as a substation cross-tie, in each of the paired substations, providing at least first and second utility transformers as respective pairs of transformers, each substation having a substation bus bifurcated by a substation bus tie breaker and forming at least a pair of substation bus segments, each pair of transformers feeding a respective substation bus via respective utility breakers, each of the transformers in a transformer pair being connected to a different substation bus segment, providing electric power supply loops for serving loads, and plural loops interconnecting with each of the substation bus segments, each loop beginning and ending with an interconnection to the same bus segment via a bus segment distribution breaker.

In an embodiment, the first method further comprises the step of for each of the loops in a plurality of loops, augmenting distribution breakers feeding ends of the loop with loop sectionalization switches such that the loop distribution breakers and sectionalization switches are sufficient to isolate any loop connected load from the related substation bus segment.

In an embodiment, the first method further comprises the step of controlling first and second interconnectable substations configured to supply the campus electric power infrastructure by entering an island mode of operation when first and second substation busses are not energized and an adjacent utility feeder supplying the substations is not energized, performing a utility breaker reclosing sequence when a substation bus is not energized and its adjacent utility feeder is not energized, performing a substation crosstie breaker reclosing sequence when a substation bus is not energized, its adjacent utility feeder is not energized, the other substation bus in energized and a substation crosstie breaker is tripped, and opening distribution breakers in the substation and entering a cross tie control mode of operation when a substation bus is not energized, its adjacent utility feeder is not energized, the other substation bus in energized and no crosstie breaker is tripped.

In an embodiment, the first method further comprises the steps of: selectively performing a cross tie control mode of operation by performing a crosstie breaker reclosing sequence if a substation crosstie breaker is tripped, managing crosstie breaker load by a) determining actual breaker load and breaker safe capacity, b) allowing increased crosstie breaker load where actual load is less than the breaker's safe capacity, and c) reducing breaker load where actual load exceeds the breaker's safe capacity, load reduction measures including reducing building load or opening a distribution feeder breaker.

In an embodiment the first method further includes the steps of: checking a plurality of distribution circuits, each circuit having a central segment having ends interconnected via respective breakers A and B with peripheral segments A and B by selecting a distribution circuit to check, determining if the central segment is energized and if so returning to selecting a distribution circuit to check while unchecked circuits remain, else determining if segments A and B are energized and if so, checking if breakers A and B are tripped and if so, locking out breakers A and B and returning to selecting a distribution circuit to check else closing breaker A and returning to selecting a distribution circuit to check if not, checking if segment A is energized and if so, checking if breaker A is tripped and if so, locking out breaker A and returning to selecting a distribution circuit to check else opening breaker B if not already open, closing breaker A and returning to selecting a distribution circuit to check else checking if breaker B is tripped and if so, locking out breaker B and returning to selecting a distribution circuit to check else opening breaker A if not already open, closing breaker B, and returning to selecting a distribution circuit to check.

In an embodiment, the first method further includes the steps of: entering an island mode of operation by opening utility breaker(s) if not already open, opening cross-tie breaker(s) if not already open, starting local generator(s) and waiting for a ready to load state, closing cross tie breaker(s), determining campus load and generator capacity, if generator is at safe output, entering a crosstie operating mode, else if the campus load exceeds the generator safe capacity reducing building load and/or opening a distribution feeder breaker, and returning to determine campus load and generator capacity, and else closing the distribution feeder breaker and returning to determine campus load and generator capacity.

In an embodiment, the first method further includes the steps of: providing a building outage mode by checking power at all buildings and for each building accumulating time, outage time, when building power is not available.

In an embodiment, the first method further includes the steps of: providing an event recorder by accumulating data for a trailing time interval, where a distribution event occurred in the time interval and it is the start of a new event, store accumulated data and return to accumulating data, else accumulate data since start of event and store periodically, and where no distribution event occurred in the time interval and an event has ended, end the event else accumulate data for a selected time interval after the event and store the data.

In an embodiment the campus energy manager system comprises: an energy manager for managing electrical loads; field devices interfacing with campus loads and local generating resources; field devices sensing load related environmental variables; energy manager interface modules including bidirectional interface modules for translating field device data into a common format acceptable to the energy manager; energy manager processing and storage configured to receive information from field devices via the interface modules; and, energy manager processing and storage configured to issue commands to field devices via the interface modules.

In an embodiment the campus energy manager system comprises: a campus of buildings and related electric supply infrastructure; systems and devices external to an energy manager; an interface of the energy manager, the interface including a group of interface modules; the interface configured to exchange data between at least some of the systems and devices and the energy manager; the systems and devices including field devices and internet information sources; the interface including field modules and internet services modules; the energy manager including a processing and storage unit; the processing and storage unit configured to provide data storage, data processing, commands, and reporting; wherein the processing and storage unit utilizes the interface to acquire information relating to electric market pricing events, demand response events, and carbon reduction events; and, wherein the processing and storage unit configures the electric infrastructure to respond to at least one of an electric market pricing event, a demand response event, and a carbon reduction event.

In an embodiment the campus energy manager system further comprises: a load forecaster for forecasting energy consumption; an hourly energy consumption profile derived from data from a historical baseline year; forecast day energy consumption day determined from the hourly forecast; a difference calculated from forecast day energy consumption and a corresponding energy consumption predicted from degree day adjustments to the baseline year energy data; and, when the difference exceeds a tolerable error value, adjusting the profile to reduce the difference.

In an embodiment, the campus energy manager system further comprises: a mode determiner for managing generation; if a demand response event requiring a load reduction occurs, reduce building loads first and dispatch generators only if building load reduction fails to satisfy the demand response load reduction; if carbon reduction mode requests a reduction in carbon dioxide production, determine carbon dioxide reduction available from load reduction and dispatch of renewable generation and dispatch low-carbon fossil generation as needed to meet the requested carbon dioxide reduction; and, if a make versus buy mode determination is requested, dispatch generation during a time period where forecasted or actual electricity buy price exceeds a calculated electricity make price.

In an embodiment, the campus energy manager system further comprises: a generator minimum economic run period P; a real-time price evaluation including a real time price model builder and a real time price forecaster; the real-time price model builder using data from historical three year period including temperature, temperature forecast, real time price, and day ahead price to construct a correlation between real time price and the variables, temperature, temperature forecast, and day ahead pricing; and, a real-time price forecaster comparing a real time price threshold with forecasted real time price and configured to reduce campus load when the threshold is not exceeded for a period longer than P and configured to reduce campus load and to dispatch campus generators when the threshold is equal to or exceeded for a period longer than P.

In an embodiment, the campus energy manager system further comprises: a UPS energy storage system having a state of charge and a UPS energy storage control; a state of charge determination and an expected discharge determination; the expected discharge determination for one or more coincident periods of peak loads and peak prices based on a load forecast and a price forecast wherein discharge times and discharge rates that tend to maximize cost savings based on stored energy capacity and maximum discharge rate are determined; a determination of peak times based on expected hourly or 15 minute energy prices; if not peak time and if charged initiate standby mode or if not peak time and if not charged initiate charge mode; if peak time and if state of charge is not over twenty percent enter charge mode or if peak time and charge is over twenty percent allow discharge; and, if peak time and if charged allow discharge.

In an embodiment, the campus energy manager system further comprises: a renewable generation control for managing renewable generators for managing power quality including one or more of voltage and current variability; and, future curtailment of renewable generation being planned for when an allowed power quality variability specification is not met by a predicted power quality variability.

In an embodiment, the campus energy manager system further comprises: redundant substations each having redundant utility connected transformers and each powering plural looped distribution circuits, each end of each loop terminated at a respective distribution circuit breaker; redundant first and second local generators, each with a generator breaker in series with a respective substation supply breaker; an intertie connecting between the first generator breakers at one end and connecting between the second generator breakers at the other end; and, wherein the generator breakers and substation supply breakers can be switched to power either or both of the substations from either or both of the generators.

In an embodiment, the campus energy manager system further comprises: the first substation having a bifurcated first bus formed by first and second bus segments; the first and second bus segments interconnected by a normally closed bus tie breaker; the first bus segment being served by a first utility feed and the second bus segment being served by a second utility feed; each bus segment feeding a looped distribution circuit via substation distribution breakers at each end of each loop; and, each loop having distribution switches as needed to enable, in combination with loop distribution breakers, isolation of each loop connected load from the substation bus segment powering the loop.

In an embodiment, the campus energy manager system further comprises: a segment of the first bus and a second bus of a second substation being interconnected by a cross tie breaker; a substation control wherein energization of the first bus is checked, if the first bus is energized then return to energization of the first bus is checked else check energization of the first utility feed, if the first utility feed is energized and if a first utility feed breaker can be safely closed then close the breaker and return to energization of the first bus is checked else outage is declared, else if the second bus is energized and if the cross tie breaker is tripped and the cross tie breaker can be safely closed, close the cross tie breaker and return to energization of the first bus segment is checked else declare outage else enter island mode.

In an embodiment, the campus energy manager system further comprises: a second substation cross tied with the first substation via a crosstie breaker; a crosstie control wherein first and second substations are selectively interconnected, crosstie breaker status is checked, if the crosstie breaker is tripped, the breaker is closed and if safely reclosed return to crosstie breaker status is checked else enter outage, if crosstie breaker load exceeds safe capacity reduce building load or open a distribution feeder breaker, and if crosstie breaker load does not exceed safe capacity, close distribution feeder breaker if it is not tripped.

In an embodiment, the campus energy manager system further comprises: line segments interposed between respective pairs of end switches; means for energizing a de-energized line segment; means for isolating a de-energized line segment; and, means for determining whether a particular de-energized line segment will be energized or isolated.

In an embodiment, the campus energy manager system further comprises: an island mode control wherein closed utility breakers are opened, substation cross-tie breaker(s) are opened, controllable building loads are shed, a generator is started, the substation cross-tie breaker is closed, campus load and generator capacity are determined, and if the generator is operating in a safe range cross tie control begins, else check if campus load exceeds generator capacity and if so reduce building load or open a distribution feeder breaker and return to campus load and generator capacity are determined.

In an embodiment, the campus energy manager system further comprises: a building outage recorder system including a recorder wherein building power is checked, where there is a building power outage the recorder accumulates outage time for that building, and when the building power outage ends return to building power is checked.

In an embodiment, the campus energy manager system further comprises: an event recorder with an accumulator for accumulating data during a trailing time period wherein the event recorder monitors distribution events, if a distribution event is the start of a new event, store data from the accumulator and return to the event recorder monitors distribution events, if a distribution event is not the start of a new event, accumulate data since the start of the event and store periodically, then return to the event recorder monitors distribution events, and accumulate data during an ending time period encompassing the time the distribution event ends and store.

BRIEF DESCRIPTION OF THE DRAWINGS

The present invention is described with reference to the accompanying figures. These figures, incorporated herein and forming part of the specification, illustrate embodiments of the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
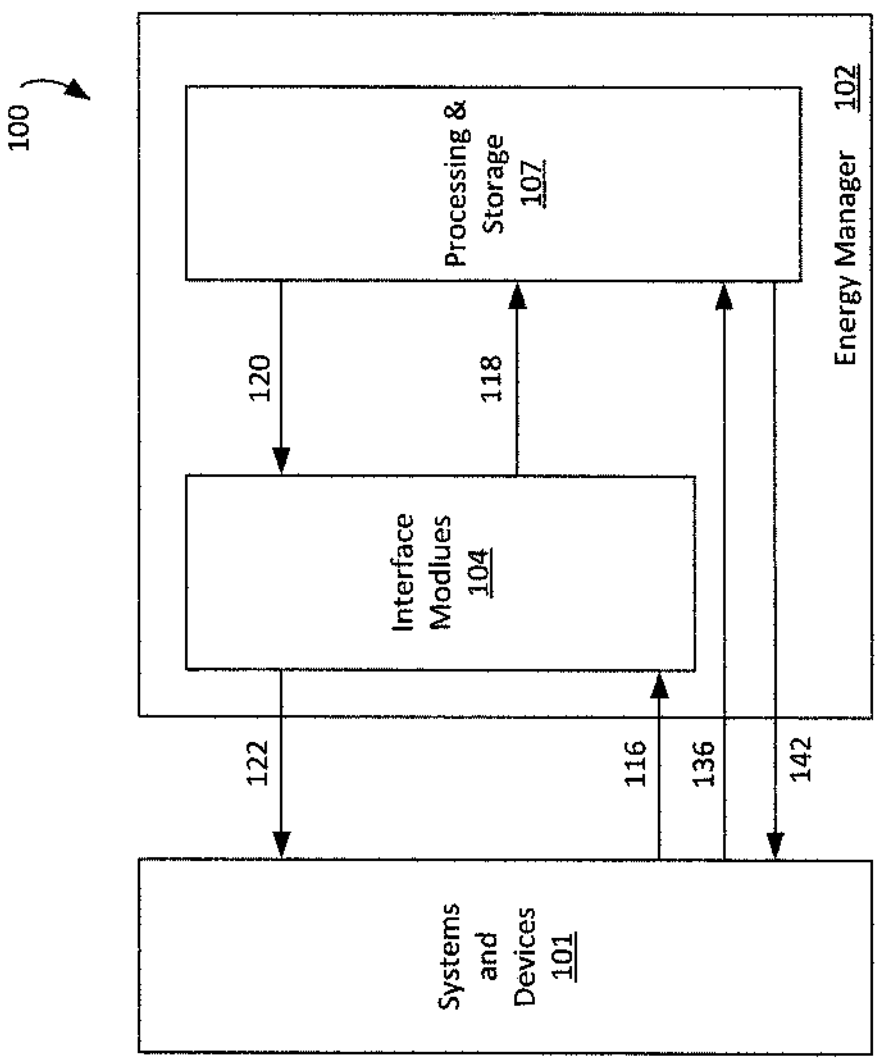
FIG. 1 shows a block diagram of a campus energy manager.

FIG. 1 shows a campus energy management system 100. Systems and devices 101 exchange data with an energy manager 102.

The energy manager incorporates interface modules 104 and processing and storage 107. The systems and devices utilize inbound/outbound data connections 122/116 to exchange data with the energy manager via the interface modules 104 which provide needed data translation functions. Interface modules exchange data with processing and storage via inbound 120 and outbound 118 data connections. As used herein, data includes passive information such as data from a sensor output and active information such as a command emanating from the energy manager 102.

In cases, selected systems and/or devices do not require interface module translation. Here, inbound 142 and outbound 135 data connections between the systems and devices 101 and the processing and storage 107 bypass the interface modules 104.

In some embodiments encryption is used. For example, password protected communications may be applied to any of connections and/or communication ways 122, 116, 136, 142, 120, and 118.

Figure 2A:
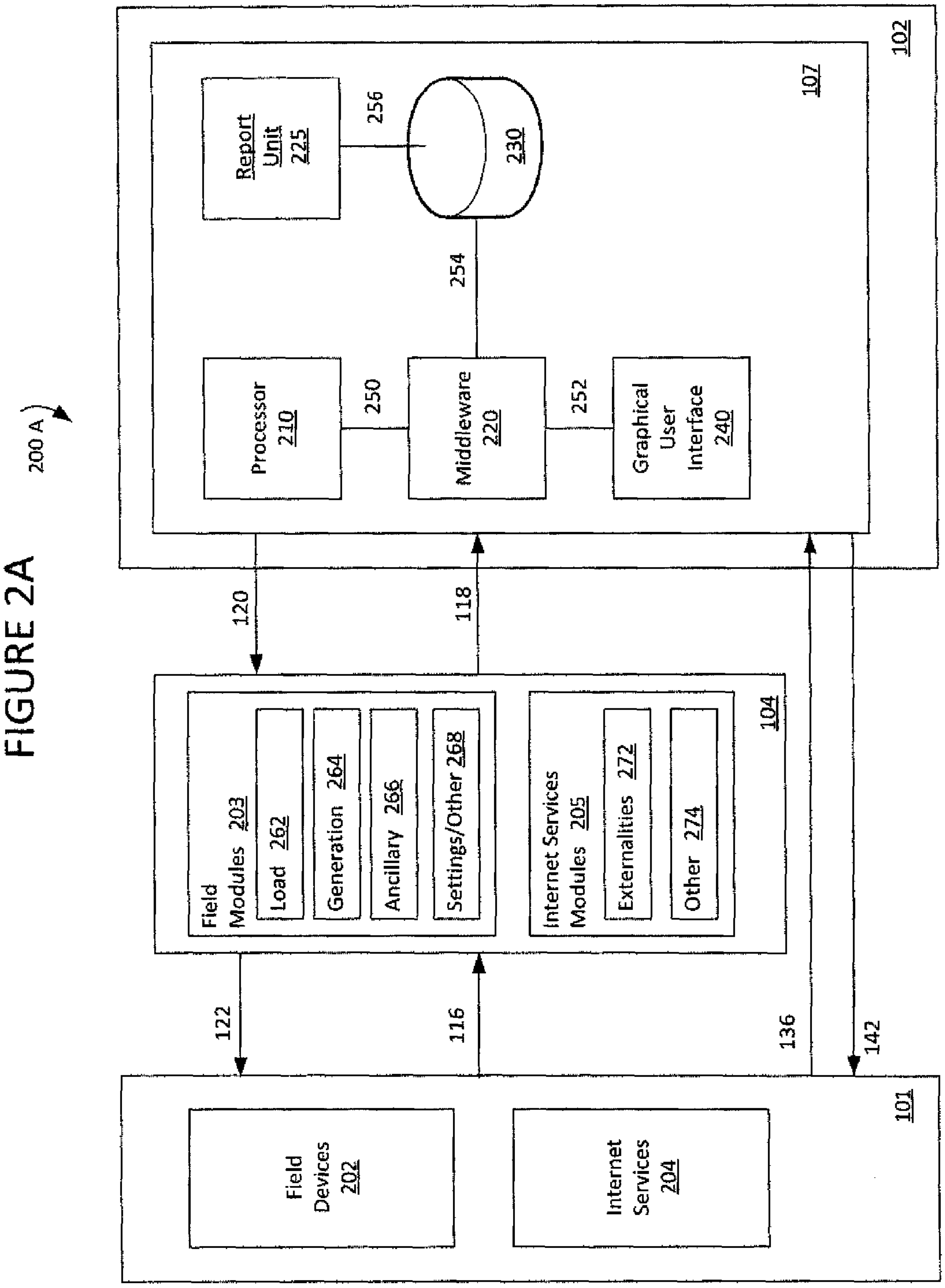
FIG. 2A shows a more detailed block diagram of the campus energy manager of FIG. 1.

FIG. 2A shows an expanded view of the campus energy management system of FIG. 1200A. As shown, systems and devices 101 include field devices 202 and internet services 204 while the energy manager 102 includes interface modules 104 and processing and storage 107.

Interface modules 104 include field modules 203 and internet services modules 205. The field modules include load 262, generation 264, ancillary 266 and settings/other 268 modules. The internet services modules include externalities 272 and other 274. The interface modules exchange incoming 120 and outgoing 118 data with processing and storage 107.

Processing and storage 107 includes middleware 220 in data communication with each of a processor 210, such as a microprocessor, via a processor data connection 250, a database 230 via a database data connection 254, and a graphical user interface 240 via a GUI data connection 252. A reporting unit 225 is in data communication with the database 230, such as an SQL or an Oracle database installed on an appropriate server, via a report data connection 256. In some embodiments, a graphical user interface is coupled to one or both of the processor and the middleware and in some embodiments reporting units are coupled to one or both of the database and the middleware.

As discussed above, the interface modules 104 of the energy manager 102 provide for translating data exchanges 122, 116 with systems and devices 101 including field devices 202 and internet services 204.

Various embodiments provided altered and/or new features. In some embodiments, field modules 203 make local decisions, for example as via software agents. In some embodiments, processing 210 is done for example in a generator agent. In some embodiments agents obtain models from modeling. In some embodiments, processor 210 only determines mode such as island, grid parallel, and safety which is sent to agents.

Figure 2B:
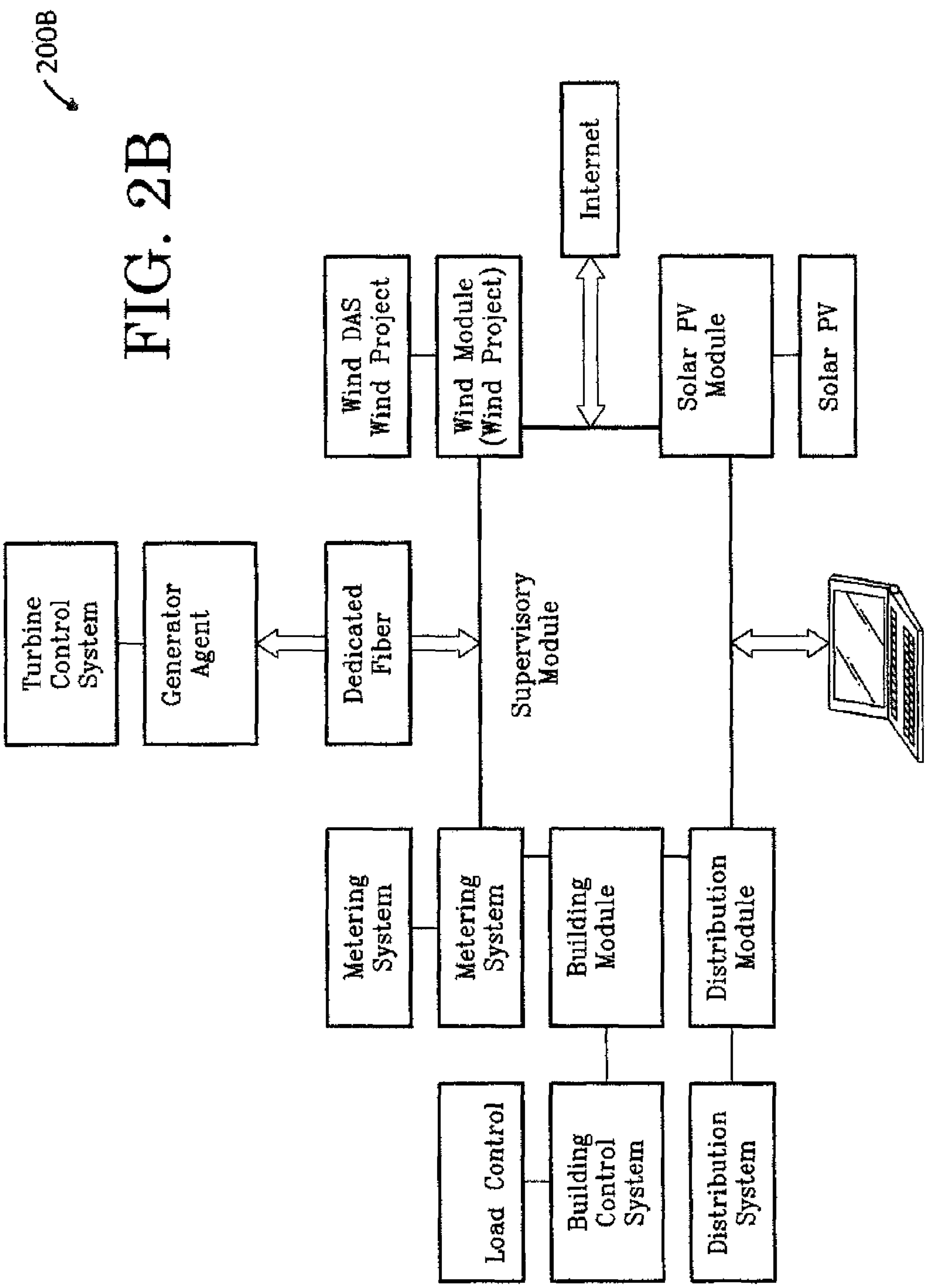
FIG. 2B shows systems connected to the campus energy manager of FIG. 1.
Figure 2C:
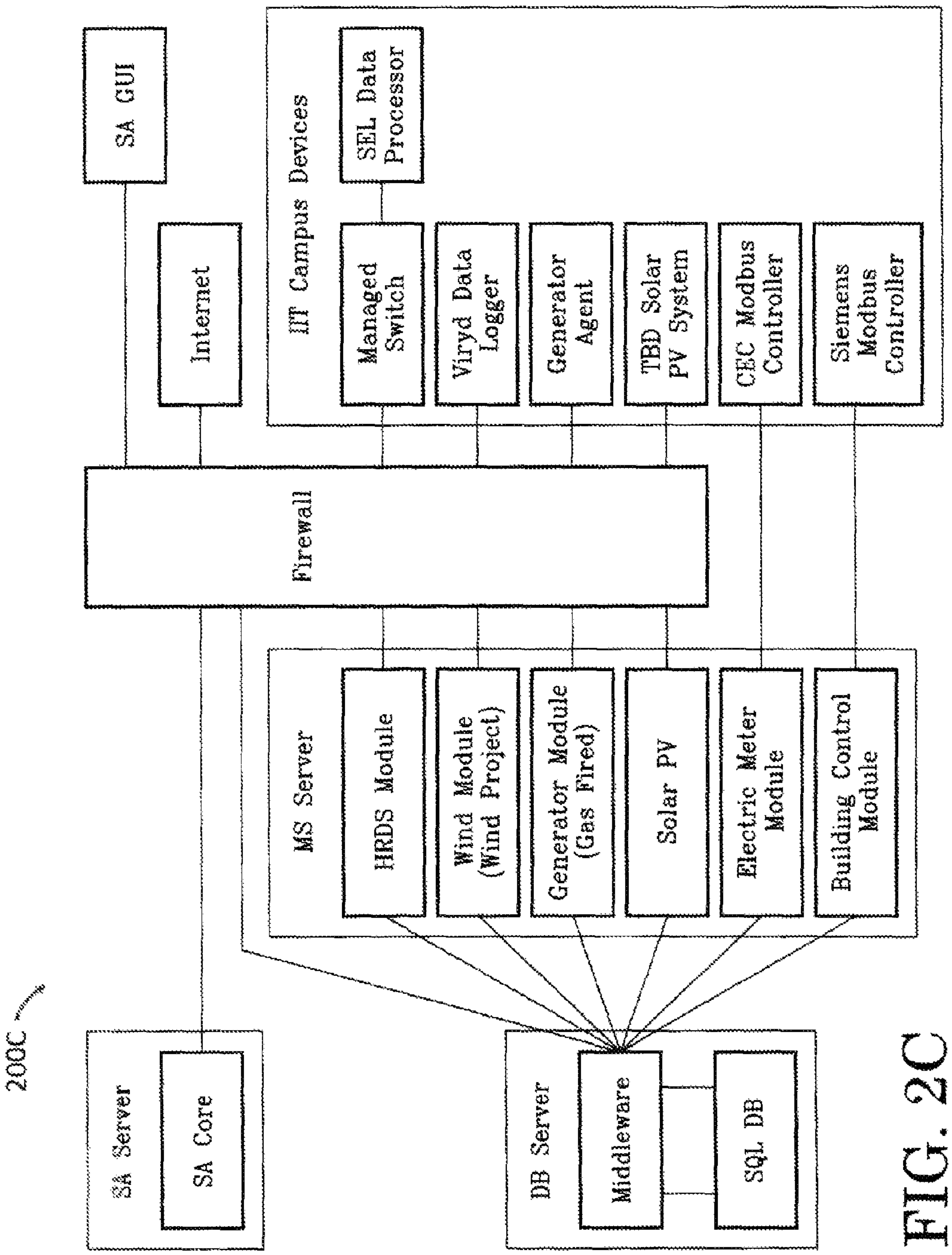
FIG. 2C shows servers and modules used in connection with the campus energy manager of FIG. 1.

FIG. 2B shows an embodiment of the invention wherein systems are connected to a campus energy manager 200B. FIG. 2C shows an embodiment of the invention with servers and modules 200C. The servers and modules are arranged to include interface modules, middleware, database and central processing decision making being distributed among different servers. In some embodiments, software modules are installed on the same server. However, distributing software among multiple servers has the potential to improve speed and reliability.

Figure 3:
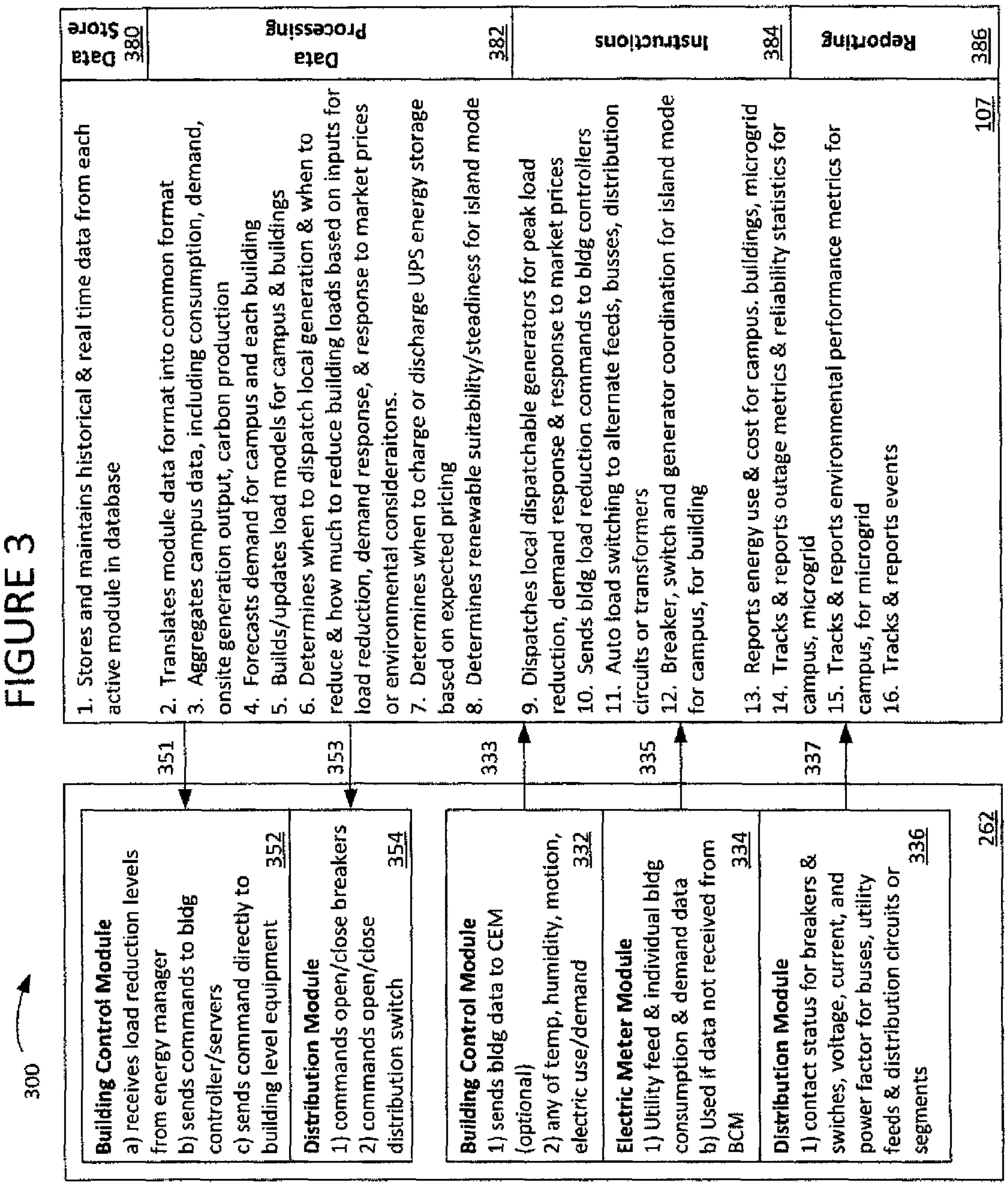
FIGS. 3-6 show module interfaces with a processing and storage of the campus energy manager of FIG. 1.

FIG. 3 shows load modules exchanging data with the energy manager 300. In particular, load modules 262 include a building control module 332, 352, an electric meter module 334, and a distribution module 336, 354.

Building module data 333, 351 exchanged with the energy manager 107 includes inbound building module data 333 and outbound building module data 351. Inbound building module data includes sensor information such as temperature, humidity, motion, electric use, and electric demand.

Outbound building module data includes commands issued to building controllers/servers and commands issued directly to building equipment such as HVAC. These commands originate with the energy manager command function 384 and include 10. Sends bldg. load reduction commands to bldg. controllers.

Electric meter module data 335 sent to the energy manager 107 includes inbound consumption and use data. Where the building control module provides the same data, these data may be redundant.

Distribution module data 337, 353 exchanged with the energy manager 107 includes inbound distribution module data 337 and outbound distribution module data 353. Inbound distribution module data includes inbound contact status for breakers and switches and inbound voltage, current and power factor for busses, utility feeds, and distribution circuits or segments.

Outbound distribution module data 353 includes commands to distribution controllers and distribution control devices. These commands originate with the energy manager command function 384 and include 11. Auto load switching to alternate feeds, busses, distribution circuits or transformers
12. Breaker, switch and generator coordination for island mode for campus, for building.

Figure 4:
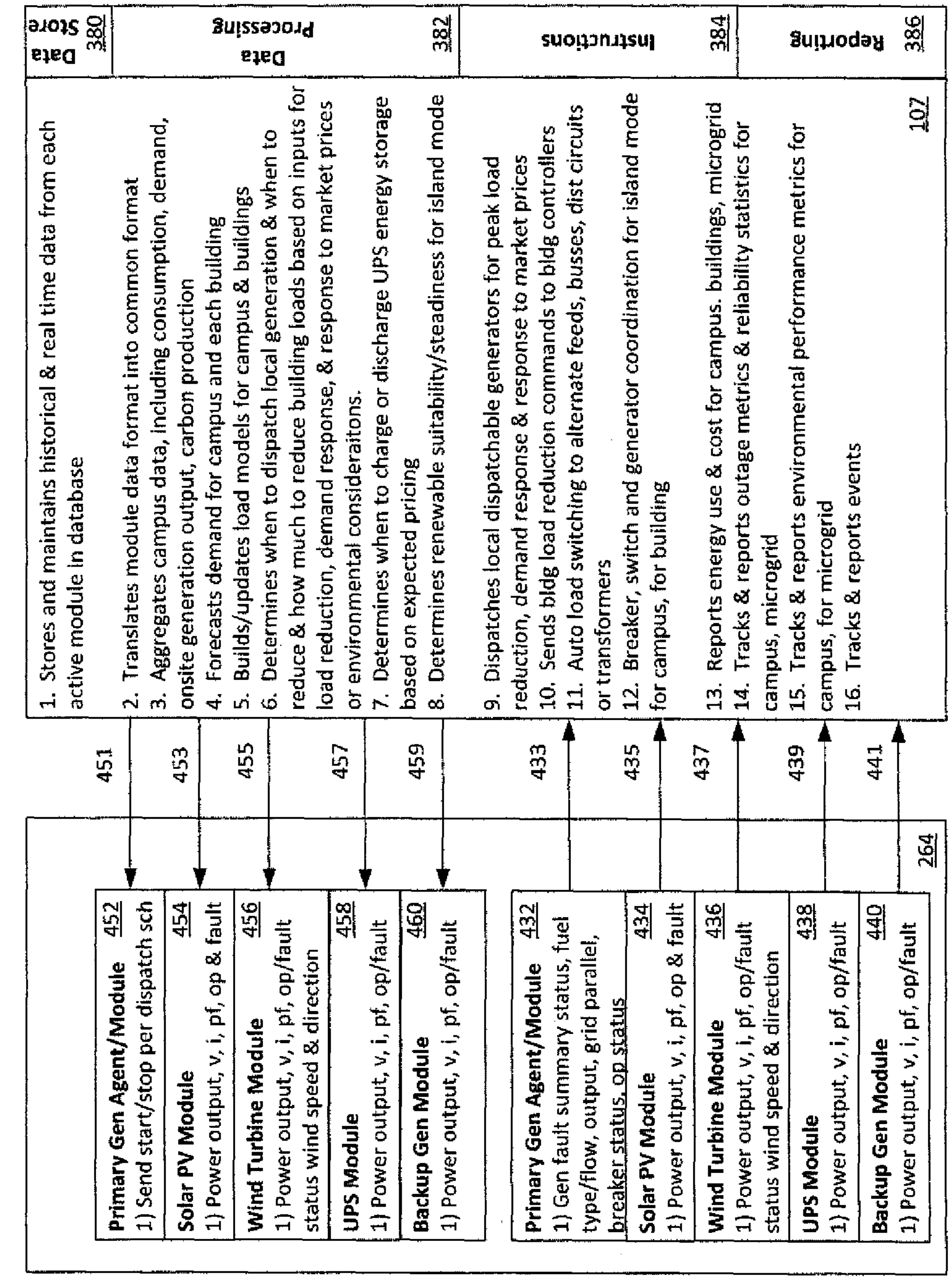

FIG. 4 shows generation modules exchanging data with the energy manager 400. In particular, generation modules 264 include a primary generator agent module 432, 452, a solar pv module 434, 454, a wind turbine module 436, 456, a ups module 438, 458, and a backup generator module 440, 460.

Primary generator agent module data 433, 451 exchanged with the energy manager 107 includes inbound generation module data 433 and outbound generation module data 451. Inbound generator module data includes fault summary status, fuel type/flow, output, grid parallel, breaker status, and operating status.

Outbound primary generator agent module data 451 includes generation stop and start commands 452. These commands originate with the energy manager command function 384 and include 9. Dispatches local dispatchable generators for peak load reduction, demand response & response to market prices
12. Breaker, switch and generator coordination for island mode for campus, for building.

Solar pv module data 435, 453 exchanged with the energy manager 107 includes inbound solar pv module data 435 and outbound pv module data 453. Inbound solar pv module data includes power output, voltage, current, power factor, operating, and fault status.

Outbound solar pv module data 453 includes solar pv operating commands 454. These commands originate with the energy manager command function 384 and include 9. Dispatches local dispatchable generators for peak load reduction, demand response & response to market prices
12. Breaker, switch and generator coordination for island mode for campus, for building.

Wind turbine module data 437, 455 exchanged with the energy manager 107 includes inbound wind turbine module data 437 and outbound wind turbine module data 455. Inbound wind turbine module data includes power output, voltage, current, power factor, operating and fault status.

Outbound wind turbine module data 455 includes wind turbine operating commands 456. These commands originate with the energy manager command function 384 and include 9. Dispatches local dispatchable generators for peak load reduction, demand response & response to market prices
12. Breaker, switch and generator coordination for island mode for campus, for building.

UPS module data 439, 457 exchanged with the energy manager 107 includes inbound UPS module data 439 and outbound UPS module data 457. Inbound UPS module data includes power output, voltage, current, power factor, operating and fault status.

Outbound UPS module data 457 includes UPS operating commands 458. These commands originate with the energy manager command function 384 and include 9. Dispatches local dispatchable generators for peak load reduction, demand response & response to market prices
12. Breaker, switch and generator coordination for island mode for campus, for building.

Backup generator module data 441, 459 exchanged with the energy manager 107 includes inbound generator module data 441 and outbound generator module data 459. Inbound backup generator module data includes power output, voltage, current, power factor, operating and fault status.

Outbound backup generator module data 459 includes backup generator operating commands 460. These commands originate with the energy manager command function 384 and include 9. Dispatches local dispatchable generators for peak load reduction, demand response & response to market prices
12. Breaker, switch and generator coordination for island mode for campus, for building.

Figure 5:
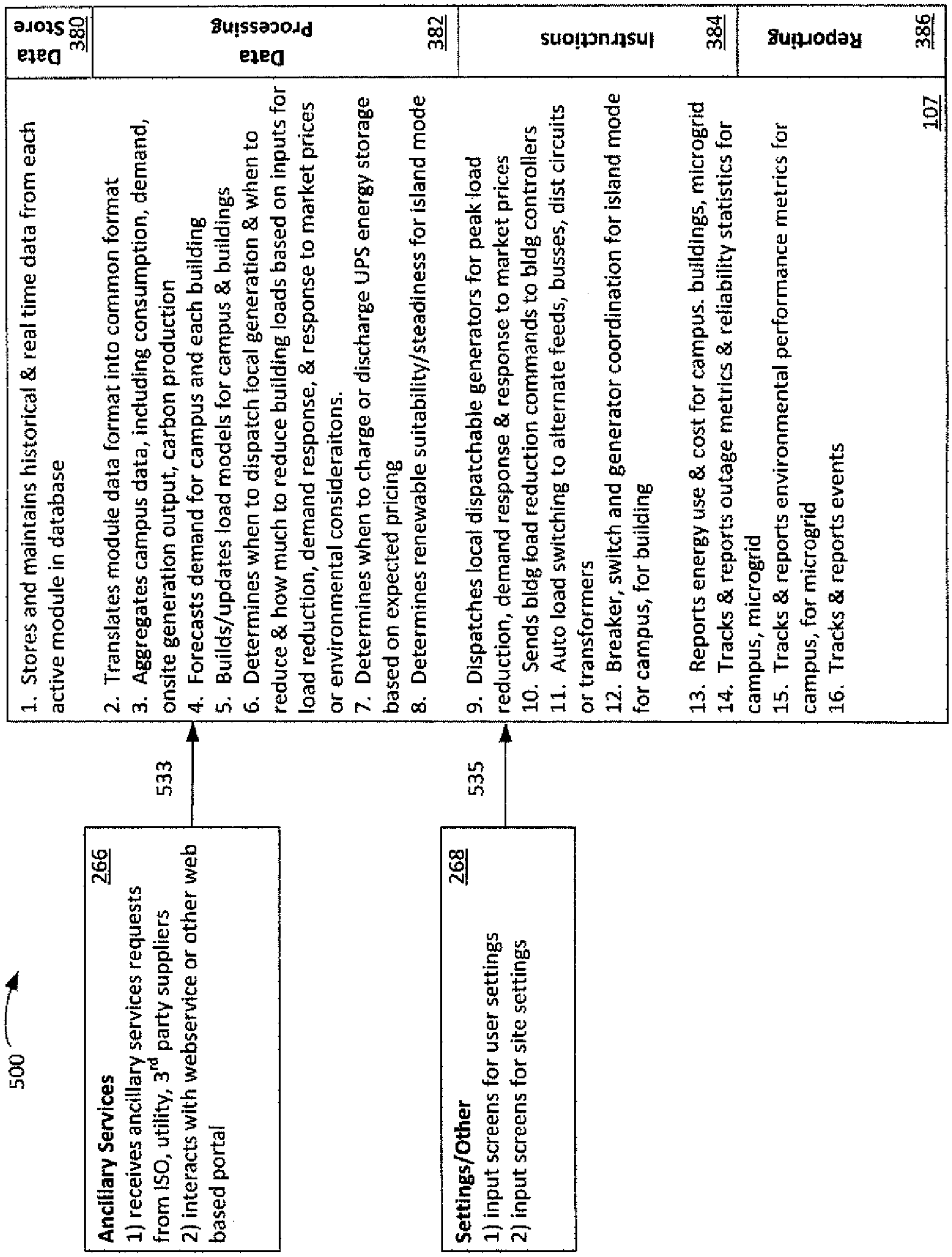

FIG. 5 shows ancillary services and settings/other modules providing data to the energy manager 500. An ancillary services module 266 and a settings/other module 268 provide data to the processing and storage 107.

Ancillary services module data 533 includes ancillary service requests of an ISO, utility, or third party supplier. Ancillary service module data also includes data received from a web service or another web based portal.

Settings/other module data 535 includes input screens for user settings. Settings/other module data also includes input screens for site settings.

Figure 6:
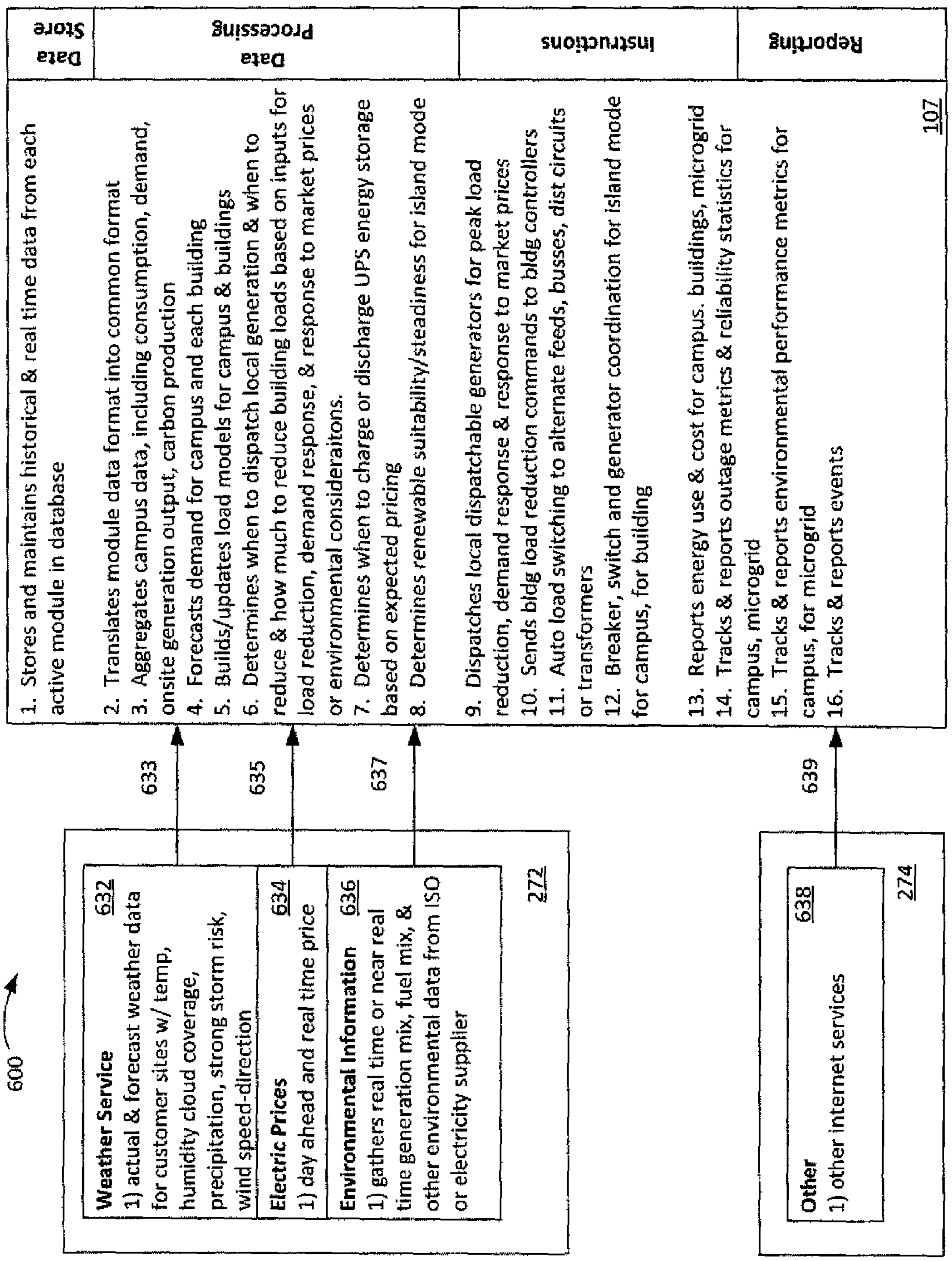

FIG. 6 shows externalities modules and other modules providing data to the energy manager 600. Externalities modules include a weather service module 632, an electric prices module 634, and an environmental information module 636. Other modules include another internet services module 638.

Data from the weather services module 633 provided to the processing and storage 107 includes actual and forecast weather data for customer sites with temperature, humidity, cloud coverage, precipitation, strong storm risk, wind speed, and wind direction. Electric price data 635 provided to the processing and storage 107 includes day ahead and real time electricity prices. Environmental data 637 provided to storage and processing 107 includes real time or near real time generation mix, fuel mix, and other environmental data from independent system operator(s) or electricity suppliers. Data from other 639 provided to the storage and processing 107 includes data from other internet services, for example, unusual threat reports such as fire reporting.

In various embodiments, software implementing the interface modules, middleware, database and the central processing and decision making for the CEM are distributed among different servers for load sharing and redundancy. Module configurations include modules for use on public networks and modules for use on private networks. A router or firewall will typically be used in connection with a private network.

Energy manager functions are shown in FIGS. 3-6 above. They can be separated into categories including data store 380, data processing 382, data commands 384, and data reporting 386. These functions are explained in more detail and seriatim below.

Data store 380 carries out the function (1) storing and maintaining historical and real time data form each active module in the database. Middleware 220 is used to gather data from field devices and/or raw sources 202 and calls procedures to store it in the database 230. The Middleware may also call stored procedures to retrieve data from the database for further processing. In some cases, a separate reporting module 225 may be used to generate reports directly from the database independent of the middleware. In various embodiments, raw data is provided by field devices 202 and/or internet services 204. In some embodiments, the middleware processes inbound data 118, 136 before it is stored in the database. The energy manager processor 210 handles most of the calculations for the CEM. As described above, in cases this processor sends commands via the middleware to systems and devices 101.

The user interface or the graphical user interface (GUI) 240 is in various embodiments configured to communicate with the middleware (for examples as a web browser) or with the core processor. Embodiments of reporting use a similar arrangement. A reporting module 225 such as a third party reporting tool is configured to communicate with at least one of the database or the middleware.

Data processing 382 carries out functions including (2) translating module data, (3) aggregating campus data, (4) forecasting demand, (5) load modeling, (6) generator dispatch, (7) UPS operation, and (8) qualifying island generation.

Translating module data is a data processing function 382. Translating module data includes translation of module data into a common format utilizing interface modules 104 (see data processing item 2 of FIG. 3-6).

The CEM communicates with software modules that access microprocessors embedded in hardware or microprocessor based hardware controllers such as controllers manipulating contacts in a substation relay. These interface software modules typically have software enabling communications with hardware ("drivers") and may using a common protocol such as Modbus, Bacnet, or DNP 3. Interface modules use these "drivers" to sd data to and from remote devices and devices hosting the interface module, and oftentimes a personal computer. The interface module typically translates received data into an XML format and forwards the translated data to the middleware.

Aggregating data is a data processing function 382. Campus data including consumption, demand, onsite generation output, and carbon production are aggregated (see data processing item 3 of FIGS. 3-6).

This data can be aggregated two ways; in time, by summing up data in intervals such as fifteen-minute intervals, or by aggregating all of the building load data to determine the campus load. These aggregations are in various embodiments done in the processor 210 and/or the interface modules 104. In an embodiment, these aggregations are done in the interface modules and the aggregated data is periodically sent to the database 230, for example every few minutes. This approach reduces the load on the database server.

Carbon production is estimated using carbon factors for different times of the day. In an embodiment, two time periods are used, on peak and off peak. On peak times are user defined as user preferences and all other hours are assumed to be off peak. It is common in many regions that during off peak times, carbon emissions on a lb/MWh basis can be higher, as dirtier plants tend to be dispatched for satisfying on peak demand. During off-peak hours, baseload plants tend to be cleaner and the bulk of the power can come from lower carbon plants such as hydroelectric and nuclear.

The equation for determining the carbon produced is $$\text{Carbon produced(lbs)}=\text{generated energy(MWh)}\times\text{carbon factor(lb CO2 equiv/MWh)}$$

Where

Generated energy is the amount of energy produced by the generator. For an end user, this can be estimated using energy consumed during a specified time period, multiplied by a factor to account for transmission losses.

Transmission losses are typically about 7% of the generated energy. In this case, $$\text{Generated energy}=1.07\times\text{consumed energy.}$$

Carbon factor is a parameter used to determine the amount of CO2 and CO2 equivalents from the generation source. Other greenhouse gases, such as methane, can be converted to an equivalent amount of CO2 in terms of causing the same greenhouse gas effect. For instance a pound of methane is approximately 23 times more potent than a pound of CO2 in terms of the greenhouse gas effect. Natural gas fired reciprocating engines can have unburned methane that ends up in the exhaust and is often unaccounted for.

Forecasting demand is a data processing function 382. Electric demand forecasts for buildings and for collections of buildings and facilities, for example a campus, are prepared by the processor 210 (see data processing item 4 of FIGS. 3-6).

Demand and consumption forecasts can be determined in different ways. In an embodiment, demand and consumption is based on a data from a year of energy consumption in a baseline year along with corresponding temperature data.

Figure 7A:
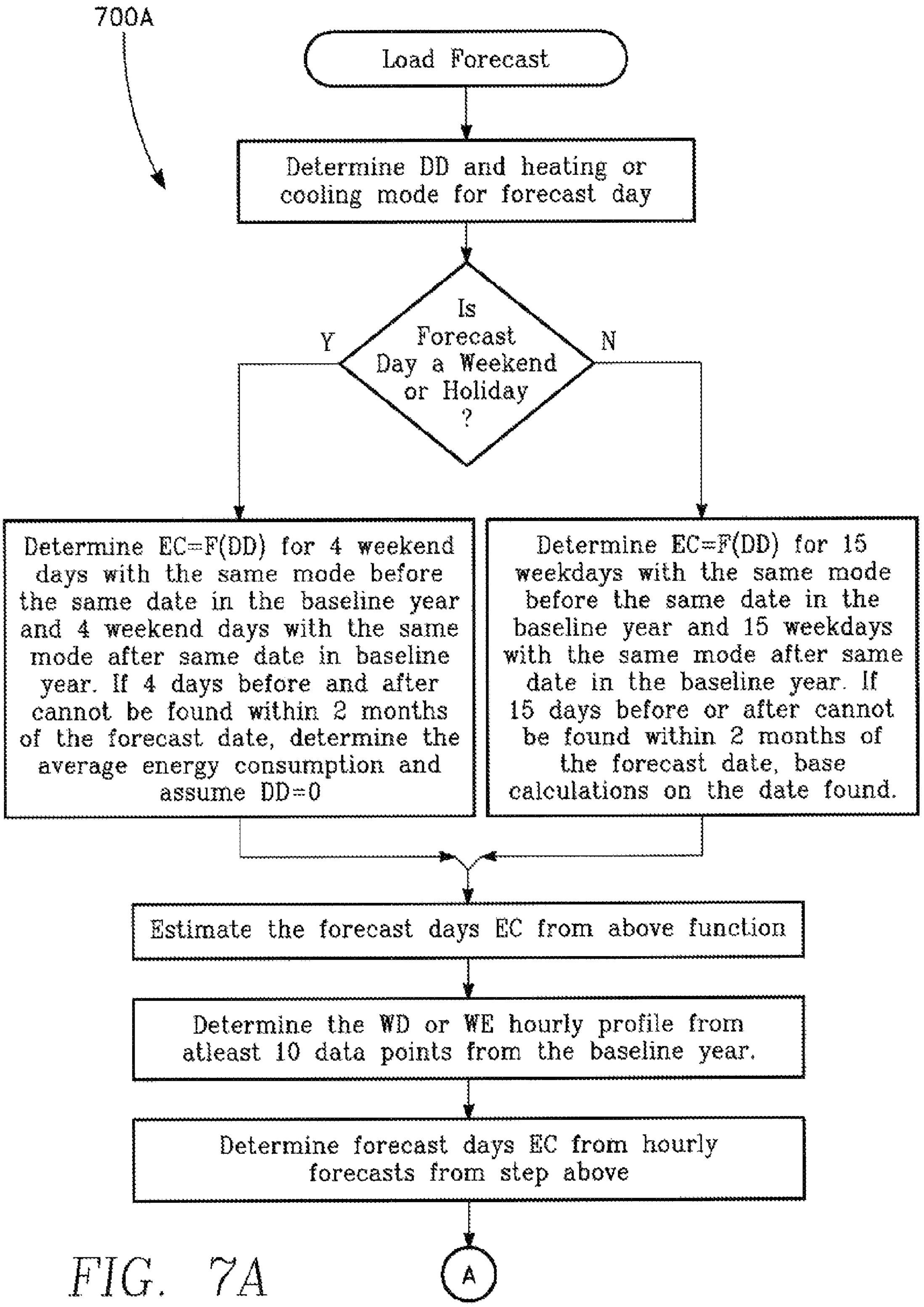
FIGS. 7A,B show a first flowchart of operations of the campus energy manager of FIG. 1.
Figure 7B:
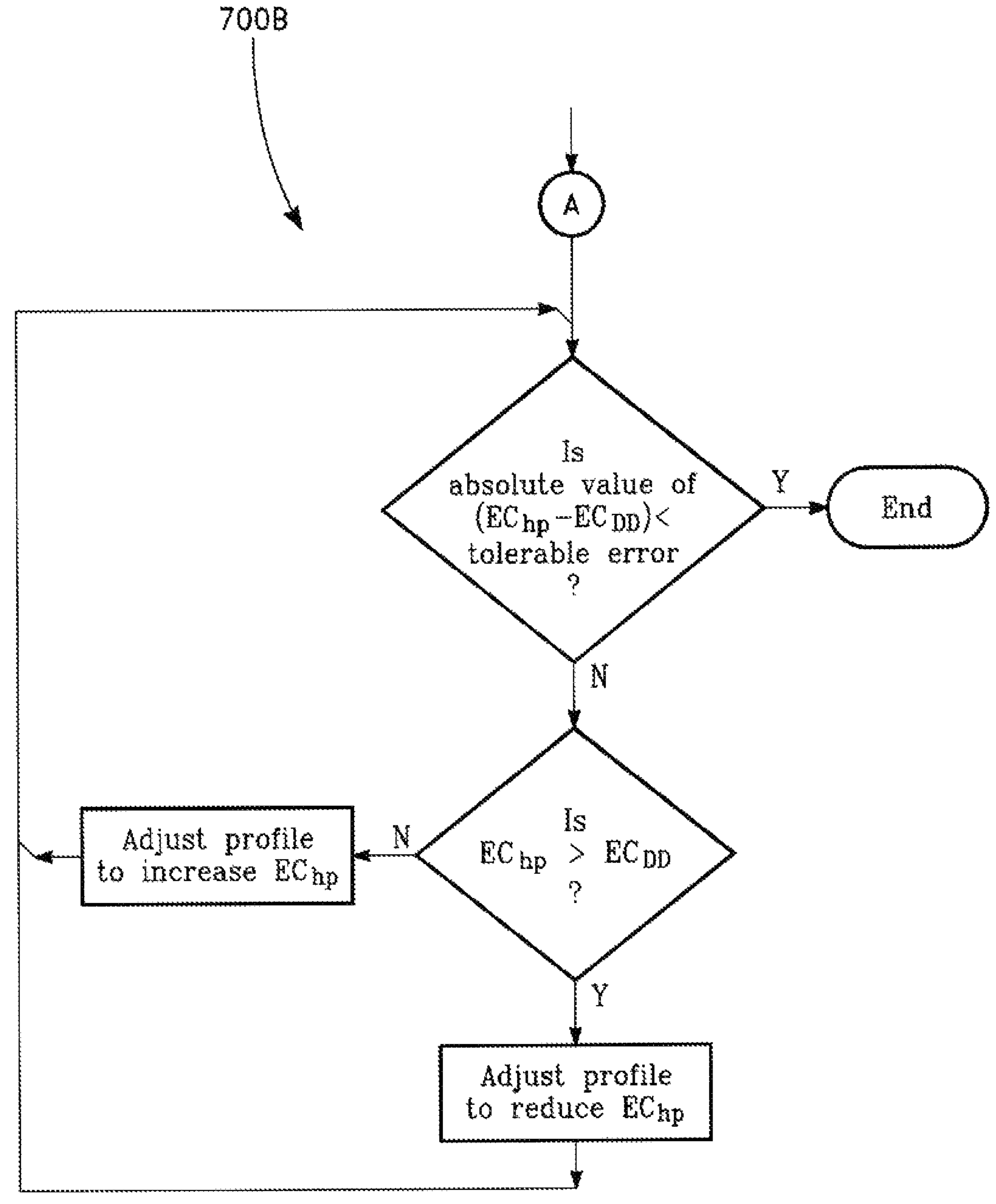

The load forecast method, shown in FIGS. 7A, B use hourly load and temperature data from a prior year called the baseline year 700A, B. Definitions used in connection with these figures are below.

DD means degree day. There are two types of degree days, one for heating days where the building needs to be heated and another for cooling degree days where the building needs to be cooled.

$$\text{Heating Degree Day(HDD)}=65-T$$

$$\text{Cooling Degree Day(CDD)}=T-65$$

Where

T=the average temperature for the day which would be determined by averaging the summing the average hourly temperatures for each hour in the day and dividing by 24 EC is the day's energy consumption found by summing the hourly energy consumption during each hour of the day. Since this algorithm is primarily concerned with electric energy consumption, embodiments include only the electricity consumption in this module.

Forecast Day means the day being forecast.

Forecast Date means the day of the year corresponding to the Forecast Day.

WD means weekday

WE—weekend day $EC_{hp}$ means a day's energy consumption as predicted from the Hourly Profile.

$EC_{DD}$ means the day's energy consumption predicted from degree day adjustments to the baseline year energy data.

Hourly Profile means an energy consumption profile based on hourly baseline year energy consumption data corresponding with the Forecast Date.

Adjusted Hourly Profile means an Hourly Profile that is normalized/adjusted by dividing the consumption in each hour of a day by the smallest of these hourly consumptions. The resulting ratio for each hour can then be multiplied by a factor, such as the ratio of the $EC_{DD}$ divided by the baseline year EC for the day. Where calculations are performed in this manner, the sum of the adjusted hourly profile substantially equals $EC_{DD}$.

Load modeling is a data processing function 382. Load models for buildings and campus are built and maintained by the processor 210 (see data processing item 5 of FIGS. 3-6). This function utilizes baseline data to a more recent year, or the previous year.

Generator dispatch is a decision made by data processing 382. Local generation dispatch and building load modifications are determined by the processor 210 (see data processing item 6 of FIG. 3-6).

This function determines when to dispatch local generation, when to reduce loads, reduction amounts/levels considering inputs for peak load reduction, demand response, and response to market prices or environmental considerations.

This functionality provides electric import control for the microgrid wherein microgrid energy requirements to be imported from sources other than microgrid and/or campus sources are calculated.

Related variables/definitions are

Fuel Cost Liquid, usually given in \$/gal

Fuel Cost Natural Gas (“NG”), entered in \$/scf

Fuel Cost, entered in \$/mmBtu (may be converted to uniform units for fuel cost)

Related calculations are $$\$/\text{mmBtu}_{NG} = \$/\text{scf} \times \text{LHV}_{NG}(\text{Btu/scf}) \text{ for natural gas}$$

$$\$/\text{mmBtu}_{liq} = \$/\text{gal} \times \text{LHV}_4(\text{Btu/gal}) \text{ for a liquid fuel}$$

where

LHV is the lower heating value for the fuel

Scf—standard cubic feet $$\text{Marginal Cost to Generate} = \text{MWh}_{generated} \times (\text{HR} \times \$/\text{mmBtu} + \text{MC})$$

where $\text{MWh}_{generated}$=the MWh to be generated by the onsite generator

HR=the heat rates of the generator, typical units are Btu/MWh

\$/mmBtu=The cost of the fuel

MC=the marginal maintenance cost of operating the generator, converted to \$/MWh Whether energy will be made or purchased is, in various embodiments, based on a make or buy analysis. Decisions to make (dispatch local generators) or buy consider the marginal cost of local generation as compared to the forecasted marginal cost of purchasing electricity. If the site is participating in a day ahead market, day ahead prices from the ISO are used as the price forecast. If the site is participating in a real time market, day ahead prices could also be used as a forecast for the real time market; other models such as historical values could also be used. If the site uses a fixed supply contract, the prices would be according to the fixed prices contract.

Local generator dispatch costs include fuel costs, maintenance costs (engine run time and engine starts/stops, in particular for gas turbines). Due to these costs, local generators are not dispatched merely to cover purchased energy price spikes. Therefore, depending on the generator, a minimum run time window might be required before starting the generator. For example, if the minimum run time window is evaluated to be 3 hours, a generator start would require forecasted market prices to exceed threshold prices for a time period exceeding 3 hours.

Figure 8A:
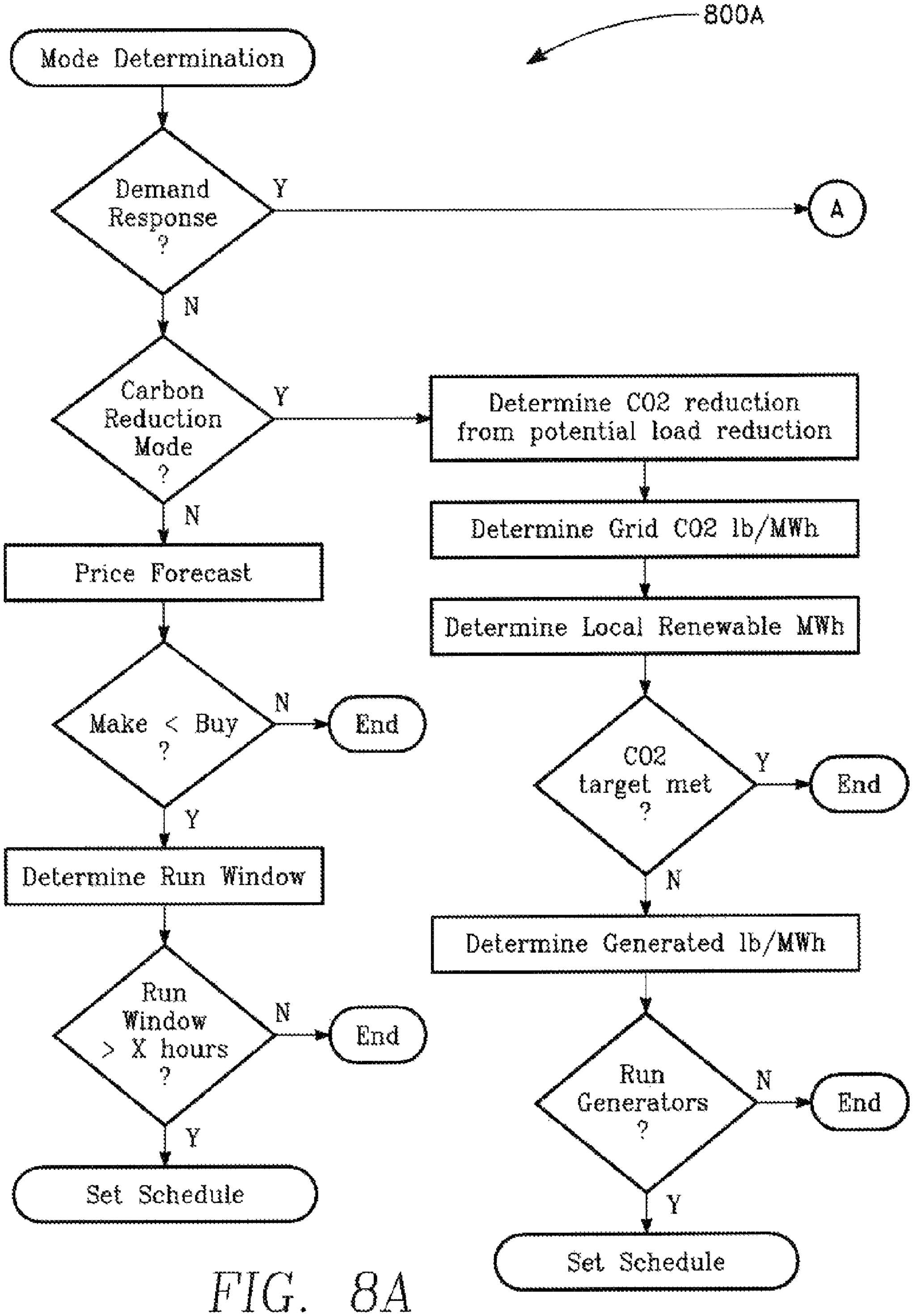
FIGS. 8A, B show a second flowchart of operations of the campus energy manager of FIG. 1.
Figure 8B:
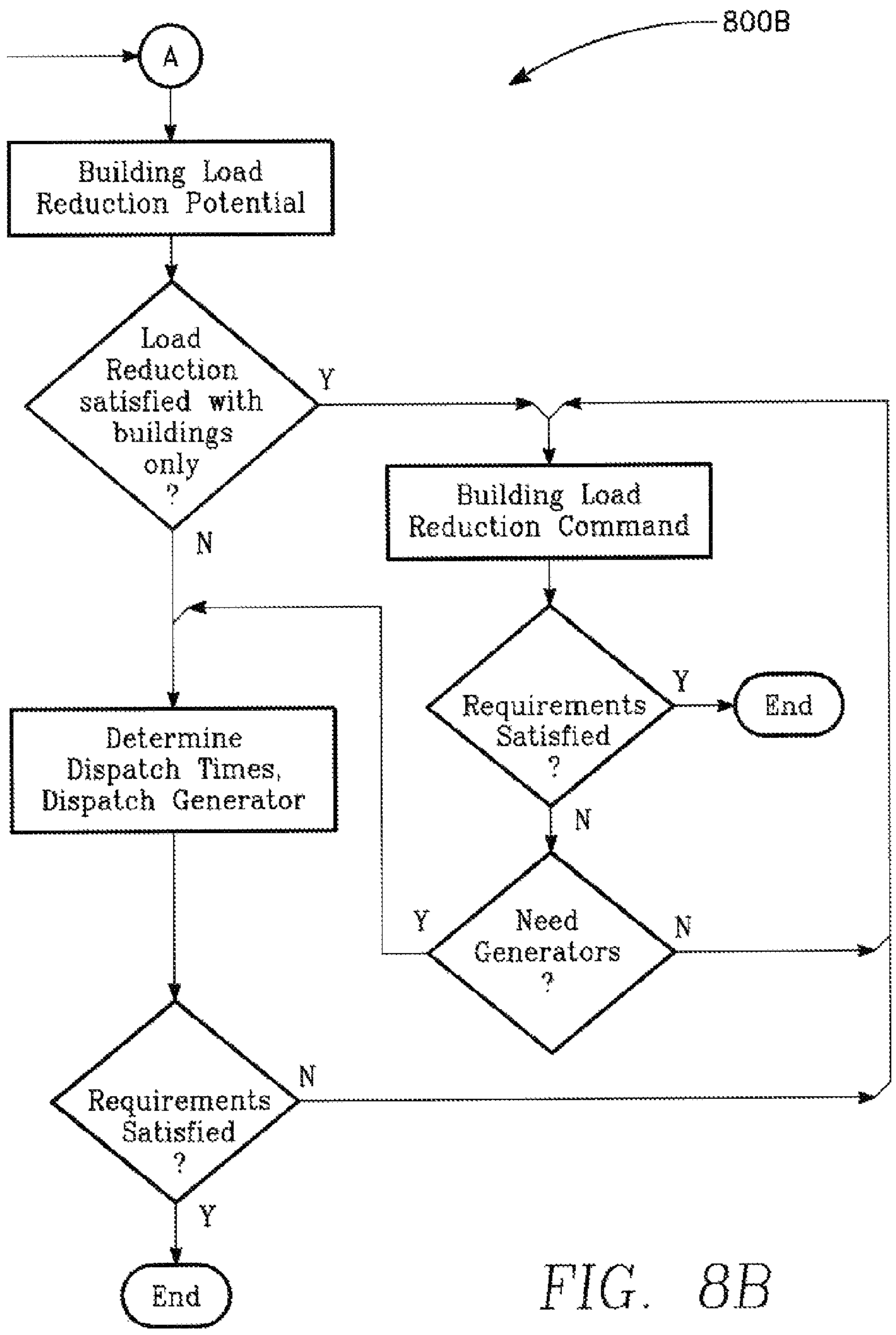

FIGS. 8A, B show generator dispatch decision-making 800A, B. Here, a mode determination is triggered by a price event, demand response, or a carbon reduction target. Demand responses lead to evaluations of building load reduction potential and dispatch of local generators where load reductions fall short of a desired load reduction. Pricing events lead to the evaluation described above. Carbon reduction events substitute low carbon local generation for external high carbon generation where carbon spreads favor local generation. In various embodiments, dispatch commands are sent through the generator interface module, or via email to a generator operator.

Figure 9A:
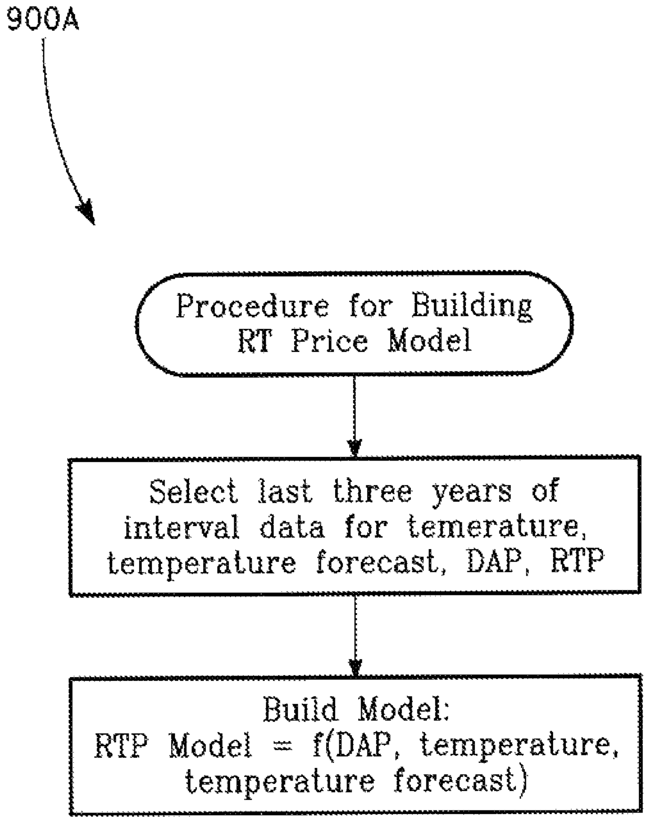
FIGS. 9A, B show a third flowchart of operations of the campus energy manager of FIG. 1.
Figure 9B:
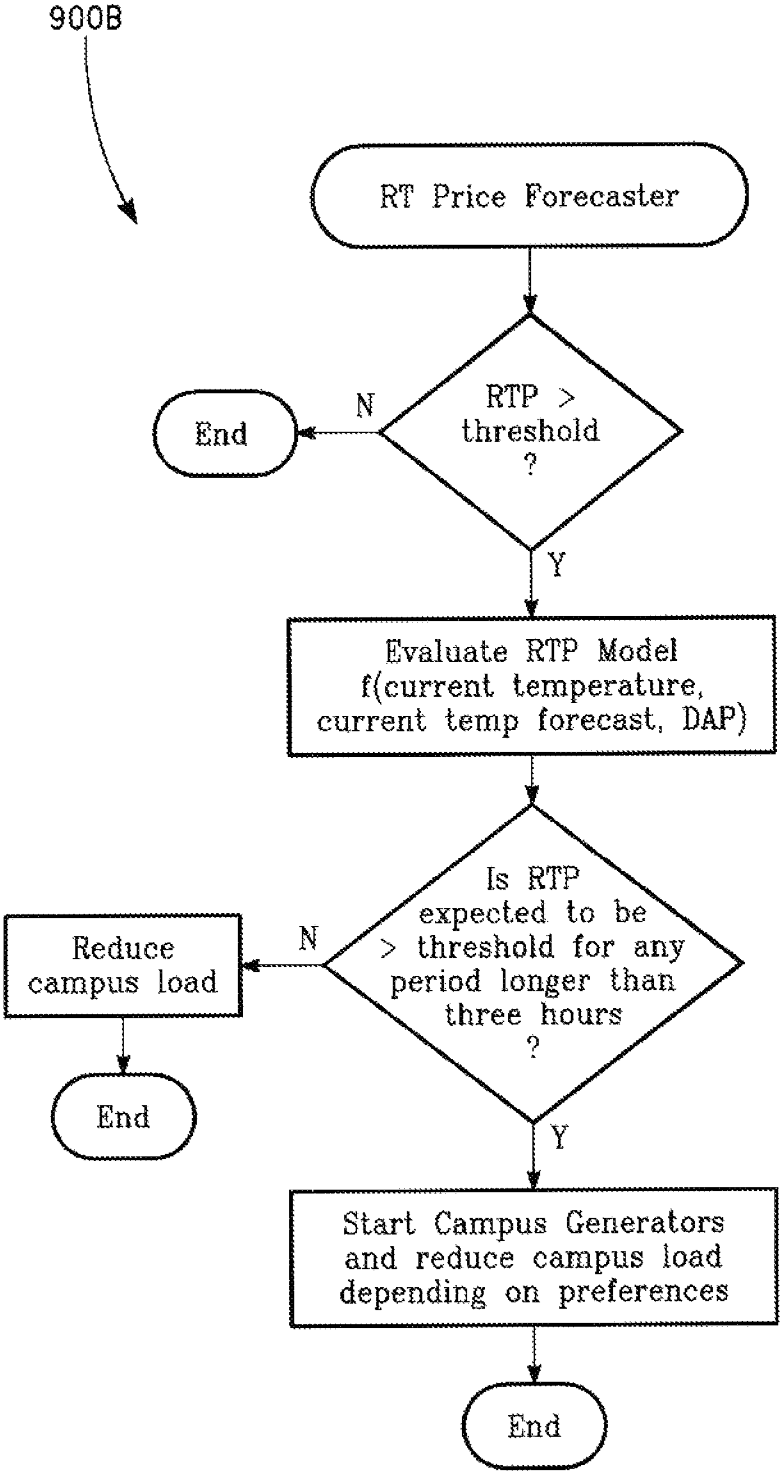

FIGS. 9A, B show price forecasting 900A, B including whether real time price data will be collected and/or stored. Generally, the cost of local generation is compared with forecast purchase price.

UPS energy storage system operation is a decision made by data processing 382. These UPS operating decisions include charge and discharge UPS energy storage based on forecast energy prices (see data processing item 7 of FIGS. 3-6).

Figure 10A:
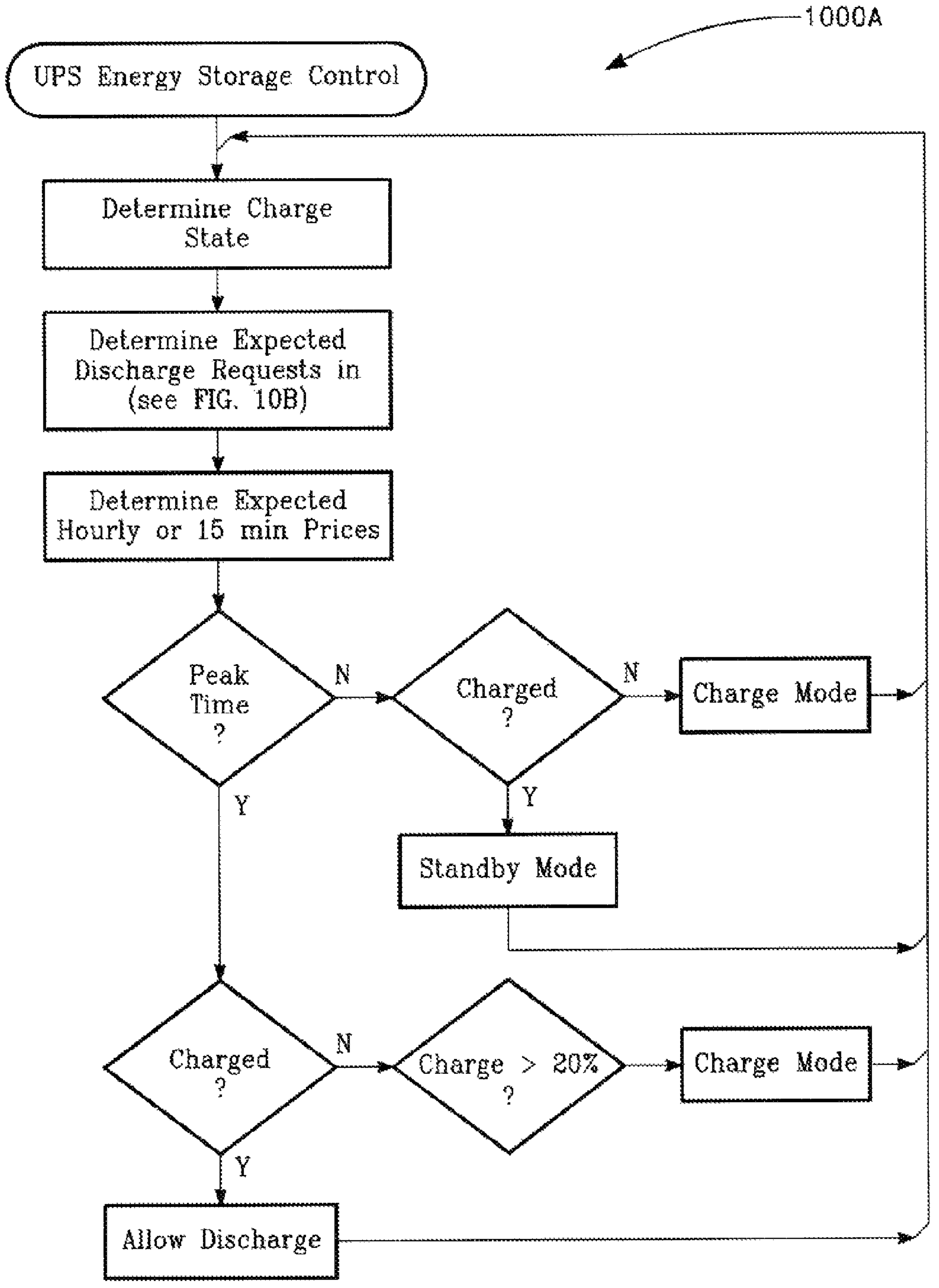
FIGS. 10A, B show a fourth flowchart of operations of the campus energy manager of FIG. 1.

FIG. 10A shows UPS and/or energy storage operating logic 1000. Benefits resulting from UPS operation are enhanced in various embodiments through the use of decision-making algorithms such as the one shown. Here, logic controls charging and discharging of UPS energy storage; there is generally a preference for charging UPS energy storage when purchased electricity prices are low and for discharging UPS energy storage when purchased electricity prices are high. As shown, conditions including on peak and charged lead to UPS energy storage discharge; similarly, conditions including off peak and not charged lead to UPS energy storage charging.

Qualifying island mode operation is a decision made by data processing 382. Here, the suitability/steadiness of a renewable resource is determined prior to relying on its generation for island mode operation (see data processing item 8 of FIGS. 3-6). For example, reliance on a solar resource in the middle of the day where weather forecasts are for fair weather will typically qualify while reliance on the same resource during nighttime hours would fail to qualify.

Further, less obvious conditions can render renewable generation unsuited for island mode power supply. For example, high ramp rates, change in power/change in time (ΔPower/ΔTime) from renewable generation such as the response of a wind turbine to a gust of wind, or the response of a solar PV panel reacting to a cloud blocking sunlight, can have a detrimental effect on a campus or microgrid operating in island mode. For instance, the primary generation source or sources for the microgrid may not be able to match the ramp rate of the renewable source and as a result frequency and voltage disturbances may occur.

Figure 10B:
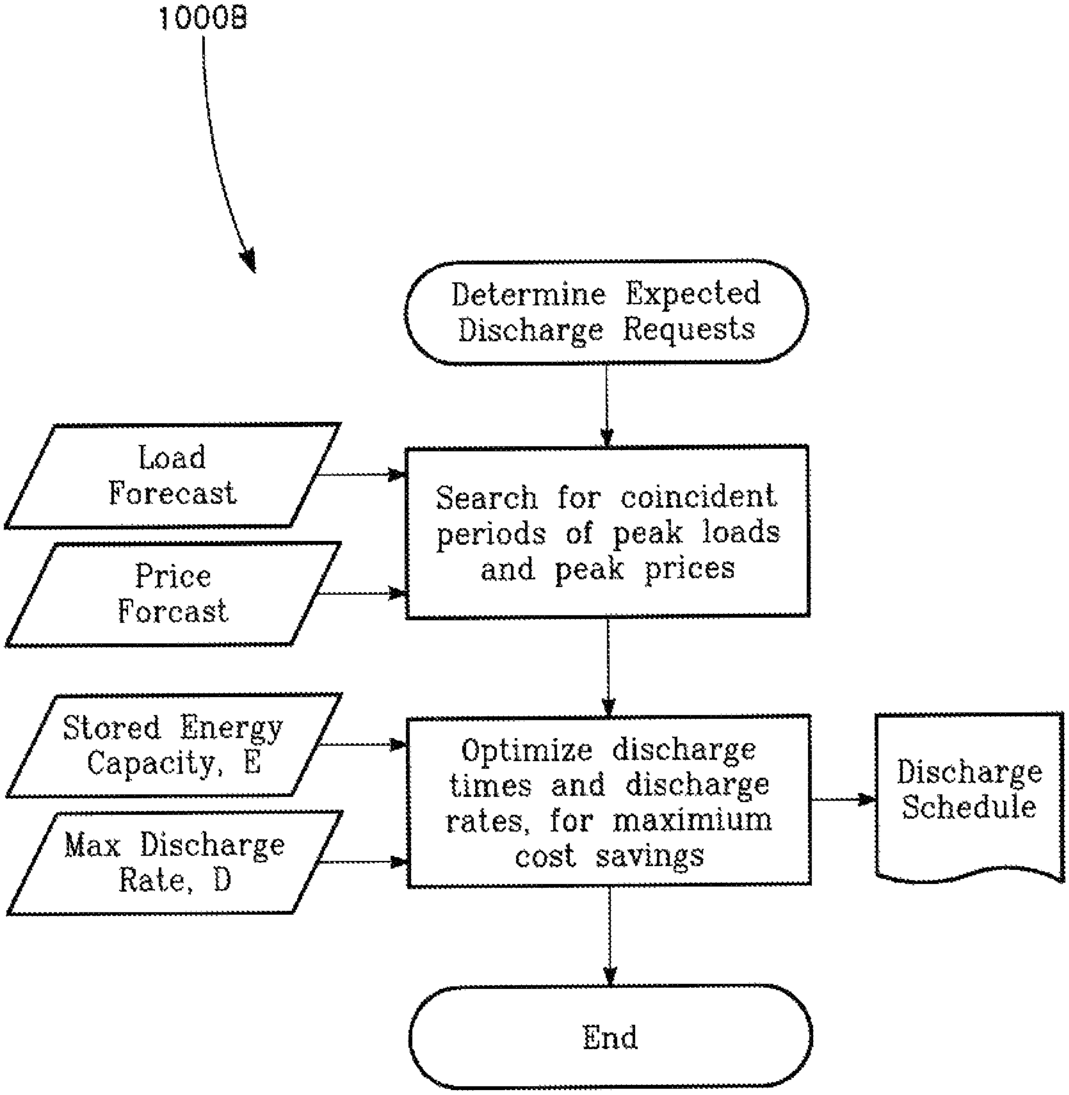

FIG. 10 B shows determining expected discharge requests 1000B. A general algorithm determines a discharge schedule for an energy storage unit such as a battery with the goal of saving on costs or taking advantage of price arbitrage between on peak and off peak periods.

A calculation for maximizing cost savings opportunity is shown below.

$$\sum_{i=0}^{n} d_i \times p_i,$$

where $d_i$=the discharge for period i, (kwh)

$p_i$=the electric price for period i ranges can ranges for the time periods that peak loads and peak prices are expected for the day.

Optimization constraints are:

$$\sum_{i=0}^{n} d_i \leq \text{the capacity of the energy storage unit;}$$

$$\sum_{i=0}^{n} d_i \leq \text{the maximum discharge rate of the energy storage unit,}$$

often limited by an inverter;

$d_i \leq$ the current or predicted campus load, (to prevent export)

In various embodiments, different techniques are used for optimizing. For example, in some embodiments, optimization is simplified by testing simple discharge schedules that have constant discharge rates for each time period. In various scenarios the optimizer tests 2, 3, 4, and 5 hour discharge schedules. The discharge rate is determined by dividing the energy storage capacity by the total discharge time.

Figure 11:
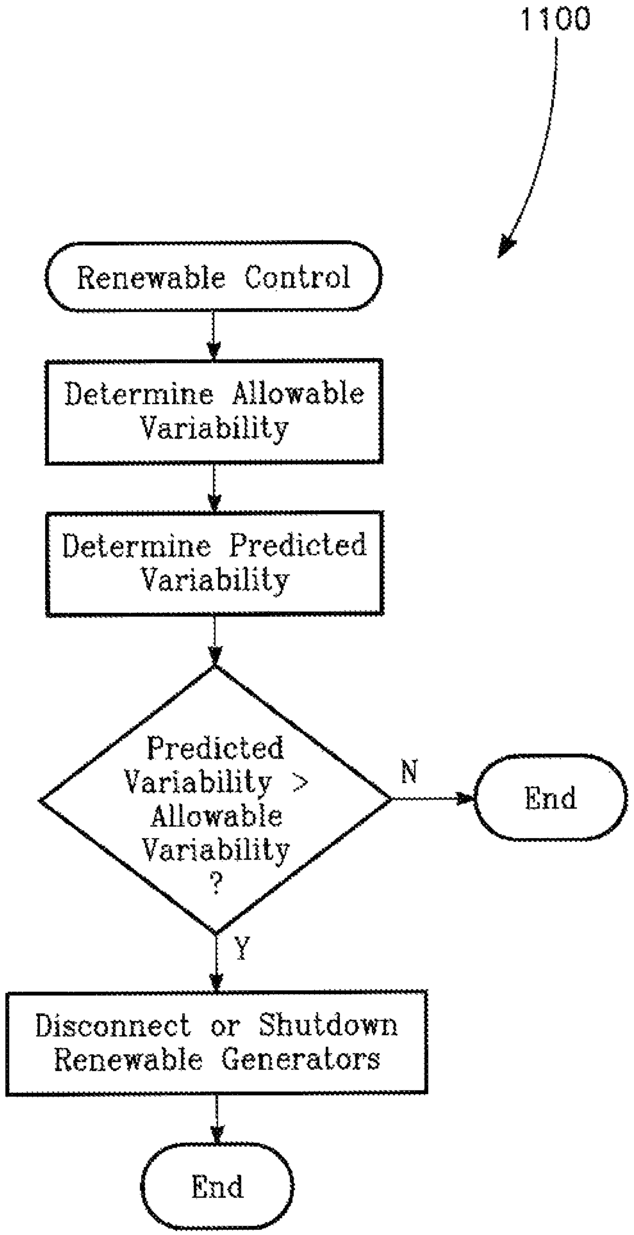
FIG. 11 shows a fifth flowchart of operations of the campus energy manager of FIG. 1.

FIG. 11 shows detection of particular unsuitable renewable generation conditions 1100. Where predicted renewable generation variability exceeds allowable variability, the renewable resource is not used. Based on modeling of the renewable energy systems output under different weather conditions, the CEM can predict the likelihood of high output variability. Once the variability reaches a certain threshold, the renewable generator can be shutdown.

Commands 384 carries out functions including issuing commands to 9) dispatch local generation, 10) reduce building load via building load controller, 11) load switching, and 12) coordinate island mode operation.

Local generator dispatch commands are issued by commands 384. Dispatch functions include local generators dispatch for load reduction, demand response, and response to market prices (see commands item 9 of FIGS. 3-6). In various embodiments, local generator dispatch commands are sent via generator interface module(s) or via email instructions to a generator operator.

Indirect building load reduction commands, also referred to as dispatch commands, are issued by commands 384. Here, building loads are curtailed when a command is sent to a building controller that controls a curtailable load (see command item 10 of FIGS. 3-6).

In various embodiments, building load reduction commands are sent back though the building control interface module. The building load reduction commands include assignment of a load reduction state number for each building. In one embodiment, 5 states ranging from 0 to 4 where state 0 indicates “do nothing” while state 4 indicates “maximum load reduction.” Exemplary load reduction logic is shown in FIGS. 8A, B. Here, a user input determines building priorities used to determine building priority where priority the sequence of buildings or groups of buildings to be curtailed until a desired load reduction has been achieved. In some embodiments, a “no curtail” setting is used to exempt certain buildings from load reduction.

Direct building load reduction commands, also referred to as dispatch commands, are issued by commands 384. Here, building loads are curtailed when a command is sent to direct load control such as a contactor capable of interrupting power supplied to the load (see command item 11 of FIGS. 3-6).

Load switching commands are issued by commands 384. Here, switching including automatic load switching alternates feeds, busses, distribution circuits, and/or transformers (see command item 11 of FIGS. 3-6).

The figures below describe control algorithms for creating a self-restoring microgrid such as a microgrid dedicated to a building, a group of buildings, or a campus of buildings. In various embodiments, the microgrid includes substations and distribution circuits. In an embodiment the campus or microgrid utilizes two substations with separate utility feeds, a generating plant, a cross tie between the substations, and looped distribution circuits that can feed power both ways to loads on the loops. Sectionalized switches separate sections of the loop.

Figure 12:
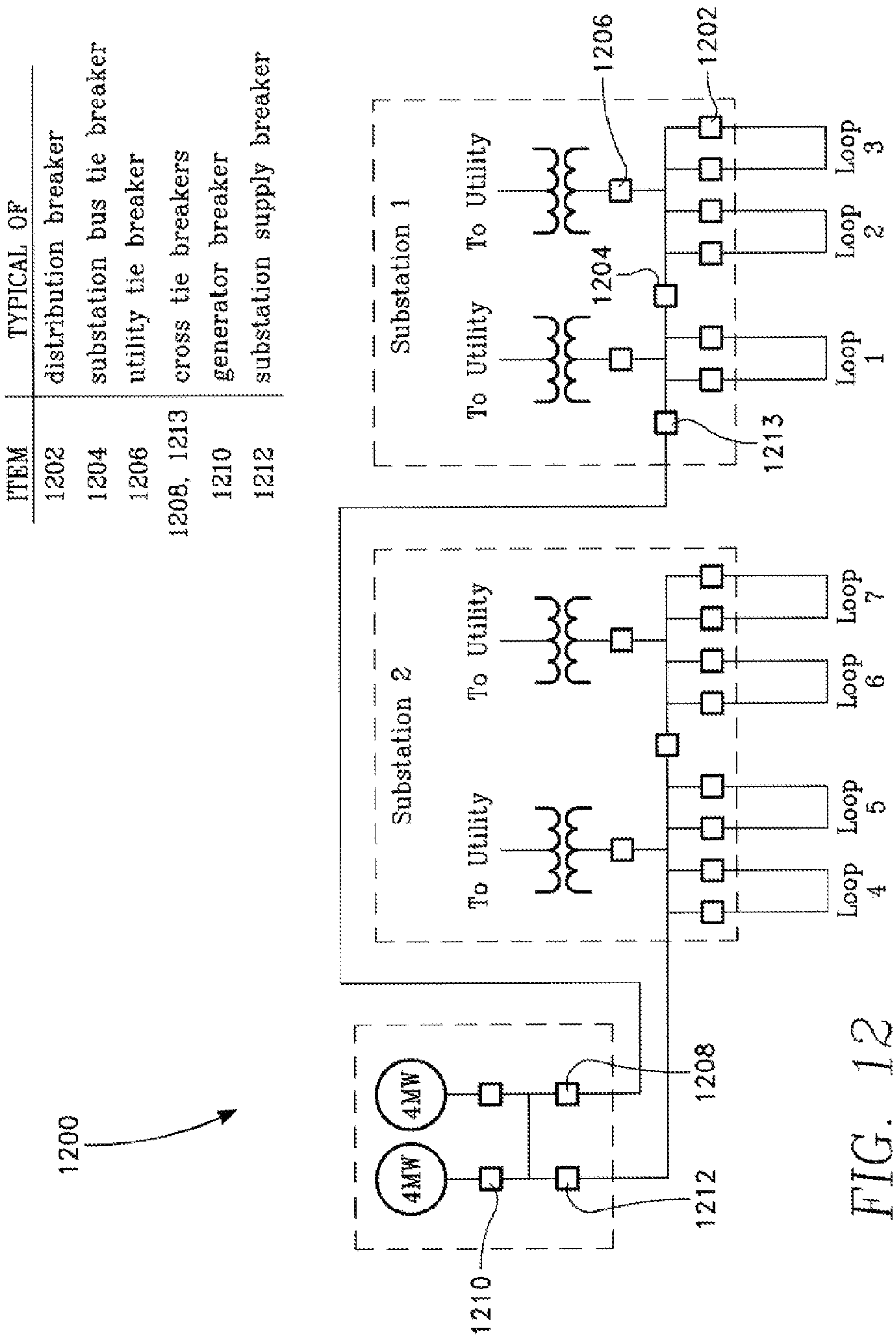
FIG. 12 shows a first exemplary electrical infrastructure for use with the campus energy manager of FIG. 1.

FIG. 12 shows an exemplary campus distribution system with sectionalized loops 1200. Breakers and/or switching devices include distribution breakers 1202, substation bus tie breakers 1204, utility breakers 1206, cross tie breakers 1208 and 1213 (one or both may be used), generator breakers 1210, and substation supply breaker 1212. As shown, redundant local generation supplies a second substation bus and is cross-tied with a first substation bus where each of the substation busses are fed by redundant utility connections. Utility and local generation breakers provide for island mode including one or both substations. The first substation bus feeds sectionalized loops 1-3 while the second substation bus feeds sectionalized loops 4-7.

Figure 13:
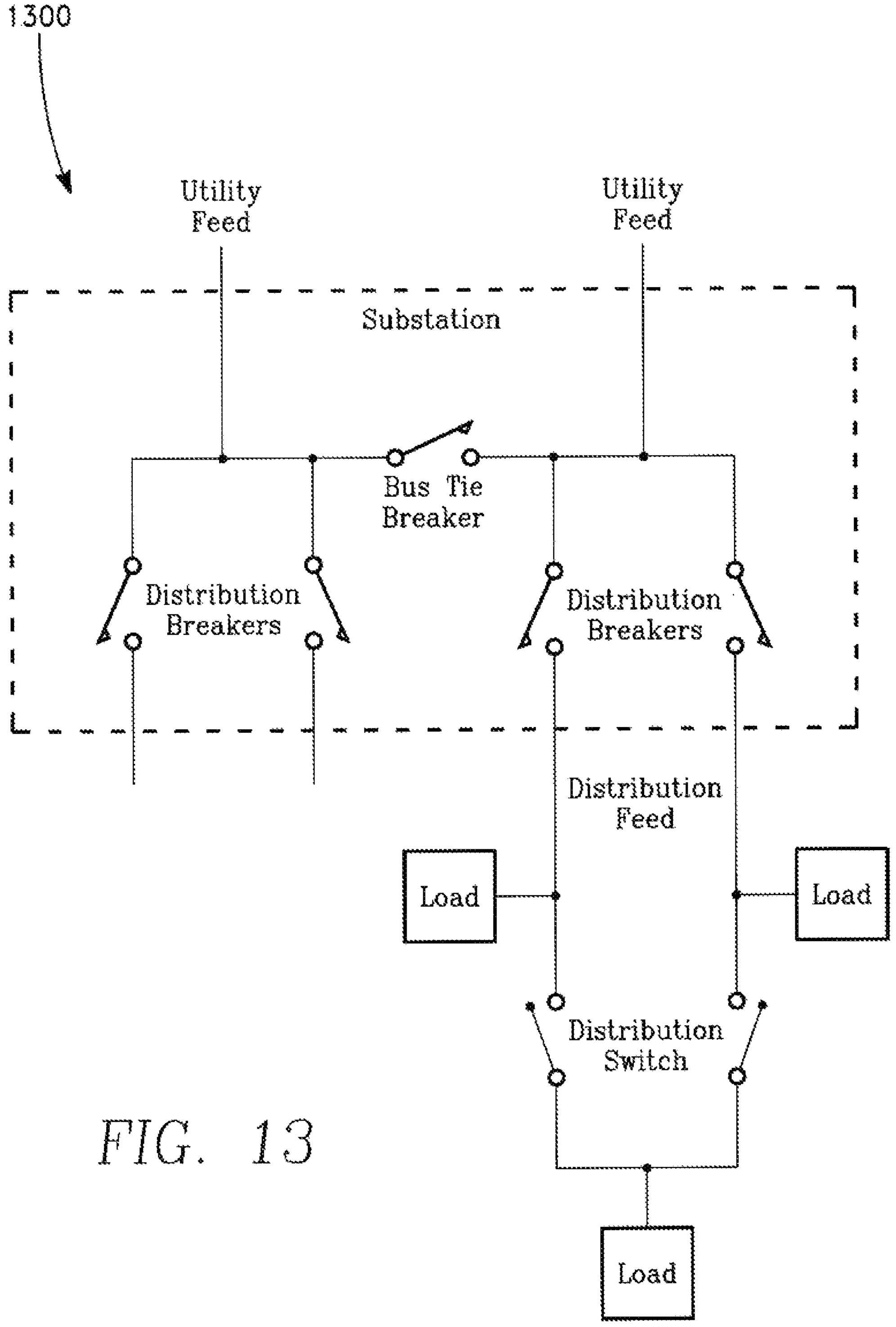
FIG. 13 shows a second exemplary electrical infrastructure for use with the campus energy manager of FIG. 1.

FIG. 13 shows electric power infrastructure including an exemplary sectionalized loop architecture 1300. As shown, substation distribution breakers supply opposite ends of a sectionalized loop. Loop taps feed loads that can be independently isolated via in-line loop distribution switches and/or a loop distribution switch and a distribution breaker.

Load switching control includes substation control, cross tie control, and distribution circuit control. The latter works on the same principles as the substation control algorithm, but controls different objects or actors.

Figure 14A:
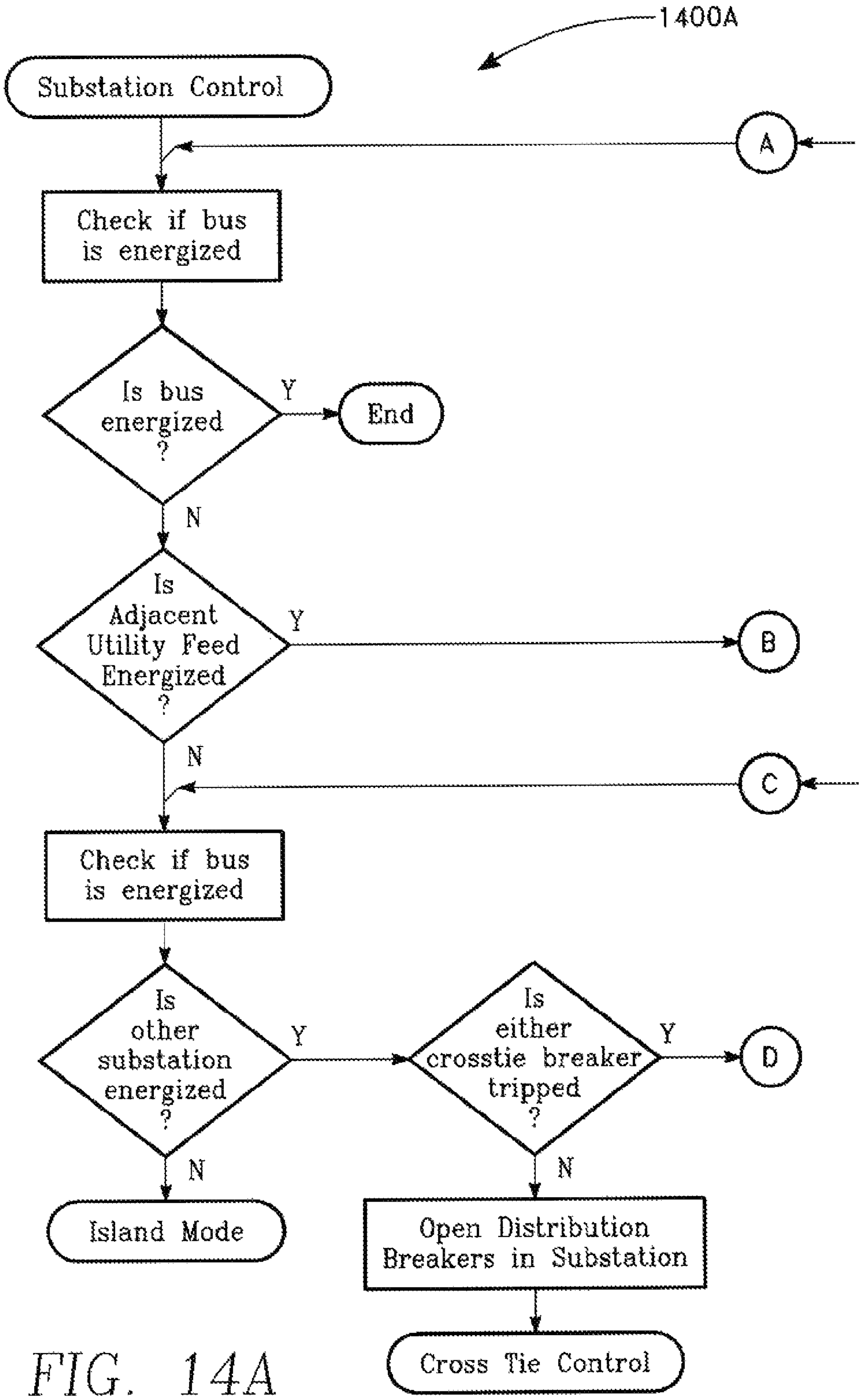
FIGS. 14A, B show a sixth flowchart of operations of the campus energy manager of FIG. 1.
Figure 14B:
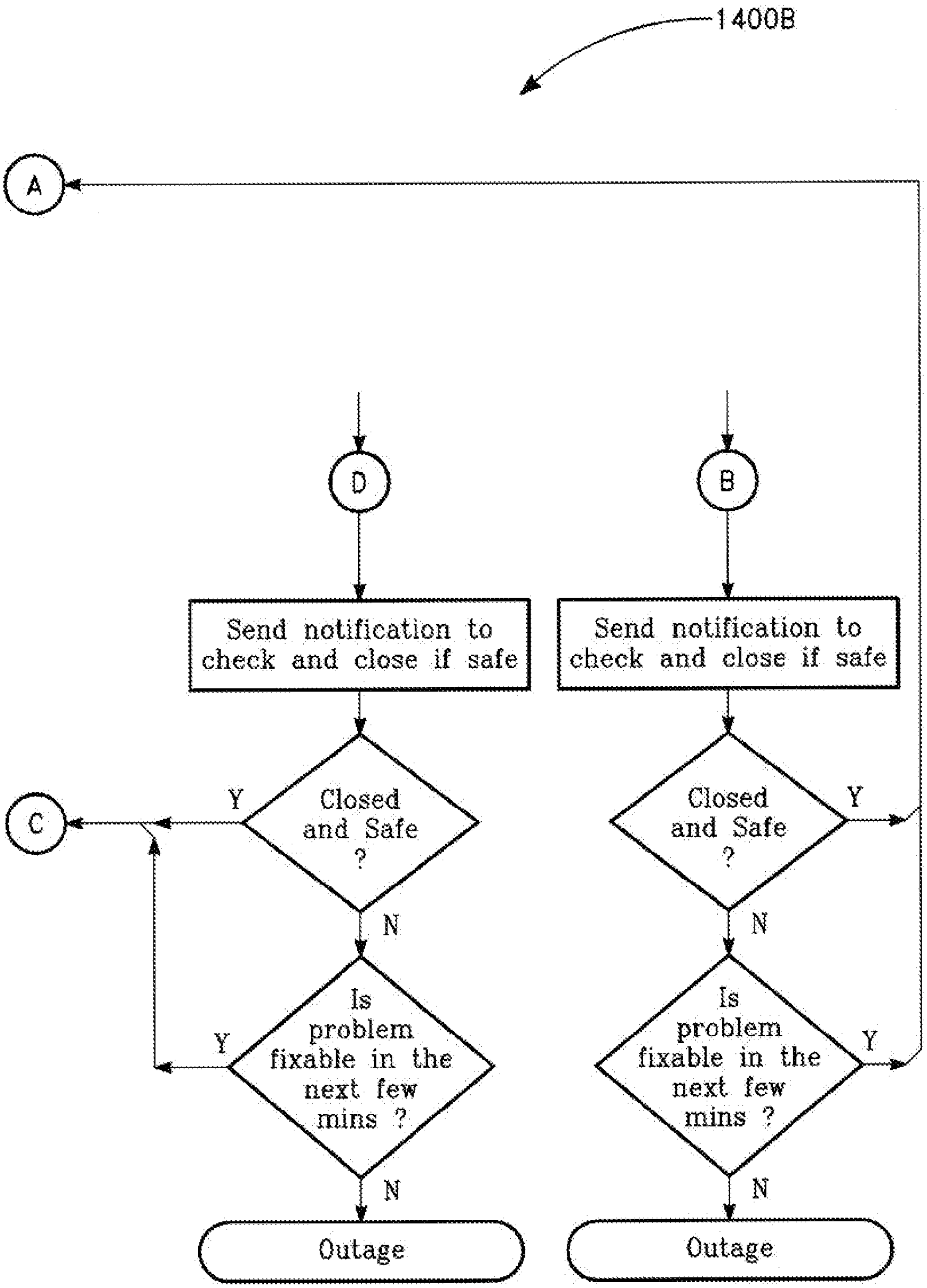

FIGS. 14A, B show substation control 1400A, B. Substation control provides for controlling switches and breakers within the substation. As shown, where the substation bus is not energized, control logic either declares an outage or enters island mode. Island mode is entered where there is no utility feed and both substations are not energized. In a first outage type, an outage occurs where the substation bus is not energized despite an adjacent utility feed being energized. Where the adjacent bus tie breaker is tripped and it cannot be successfully closed, an outage is declared. A second outage type also occurs where the substation bus is not energized despite an adjacent utility feed being energized. If the other substation is energized and a crosstie breaker is tripped, unsuccessful attempts to reclose the crosstie result in an outage. Where a crosstie is not tripped, the distribution breakers are opened and cross tie control is exercised.

Figure 15:
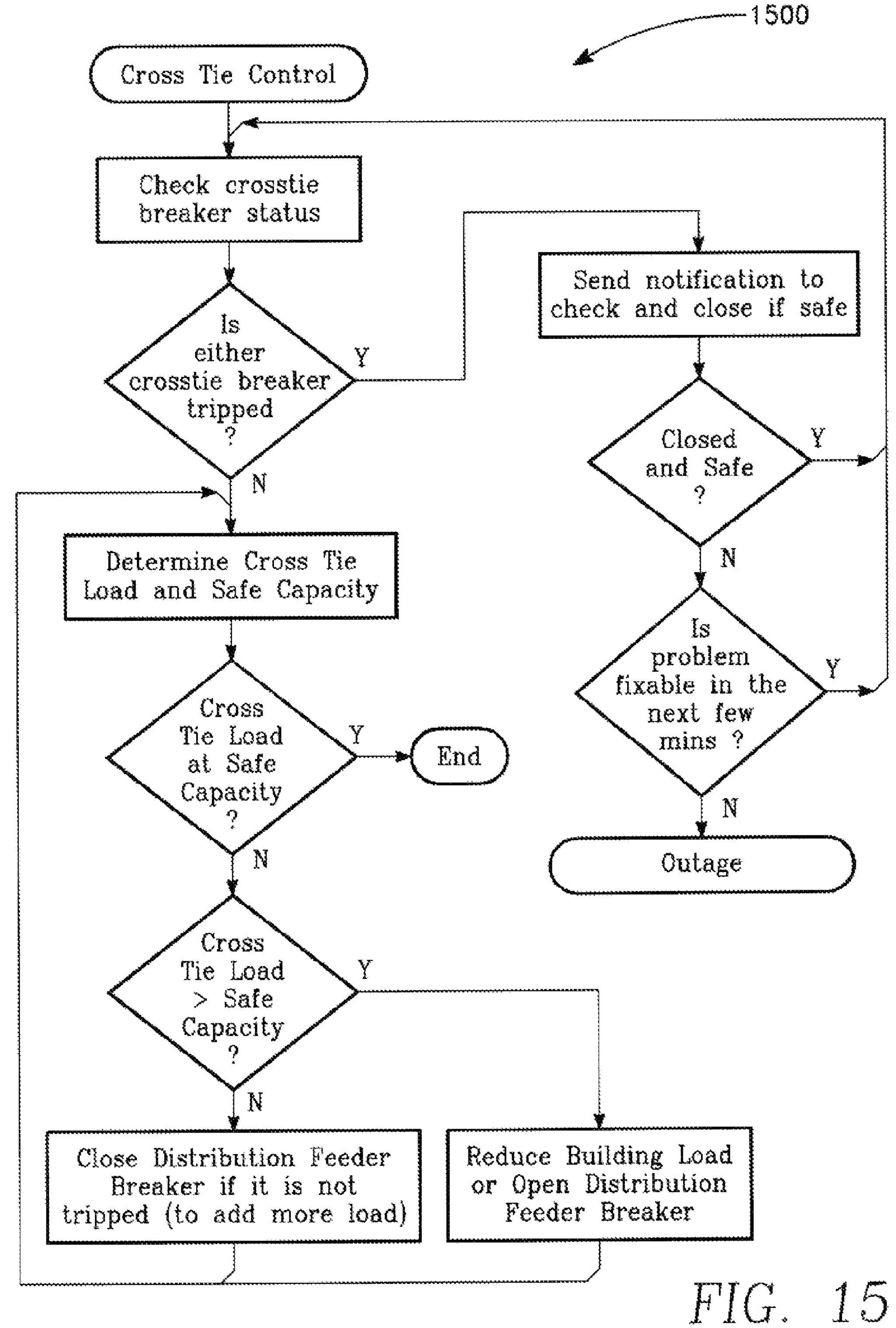
FIG. 15 shows a seventh flowchart of operations of the campus energy manager of FIG. 1.

FIG. 15 shows cross tie control 1500. Cross tie control primarily provides breaker control at ends of the substation cross tie. In operation, cross tie control seeks to reclose open cross tie breakers and to check closed cross tie breakers to assure they are not overloaded, e.g. that they are operating with a safe capacity. Where breaker operating conditions exceed a safe capacity, breaker load is reduced or the related distribution feeder breaker is opened. Similarly, where breaker operating conditions are within a safe capacity with margin, safe to close distribution breakers are reclosed.

Figure 16A:
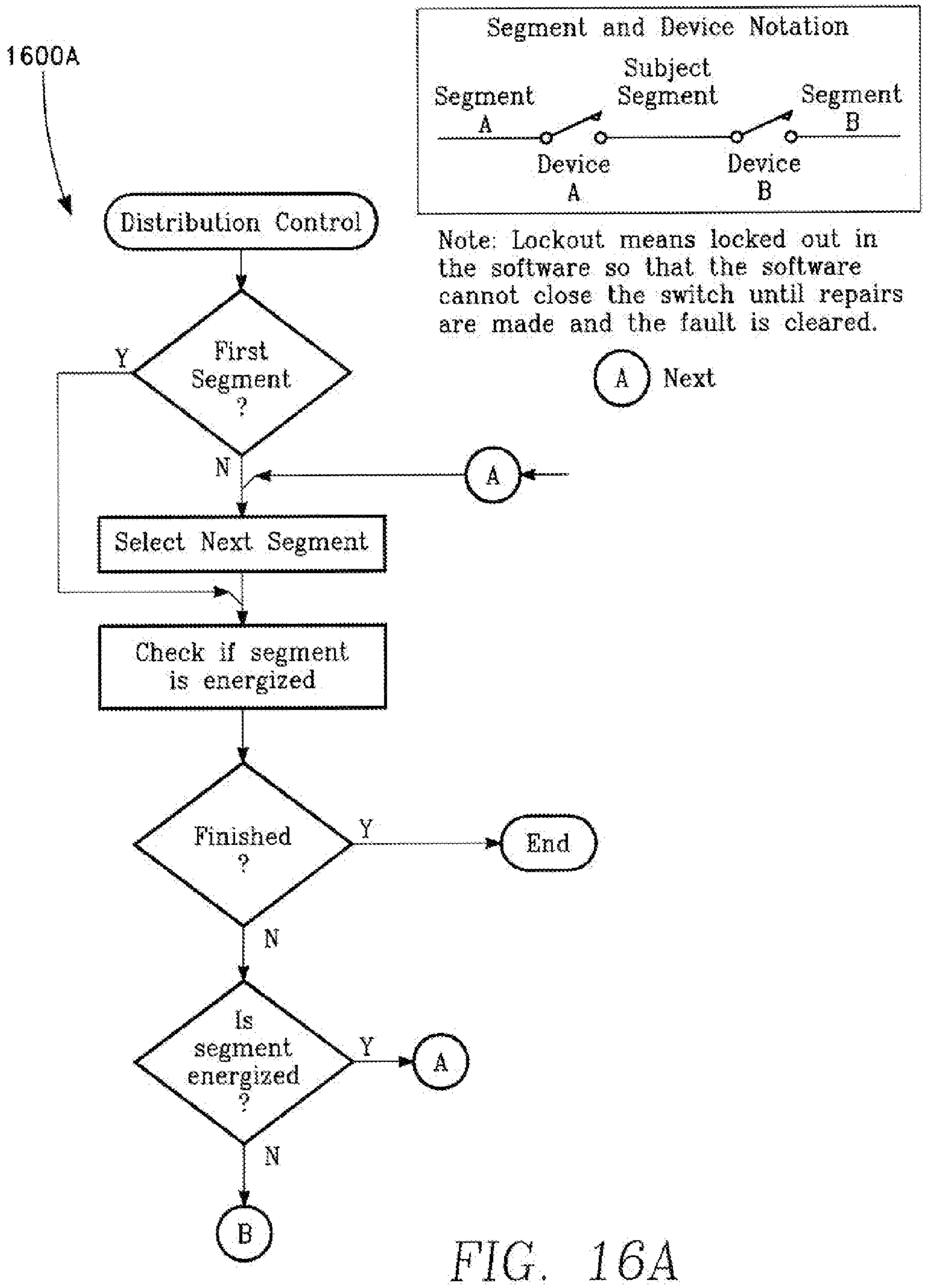
FIGS. 16A, B show an eight flowchart of operations of the campus energy manager of FIG. 1.
Figure 16B:
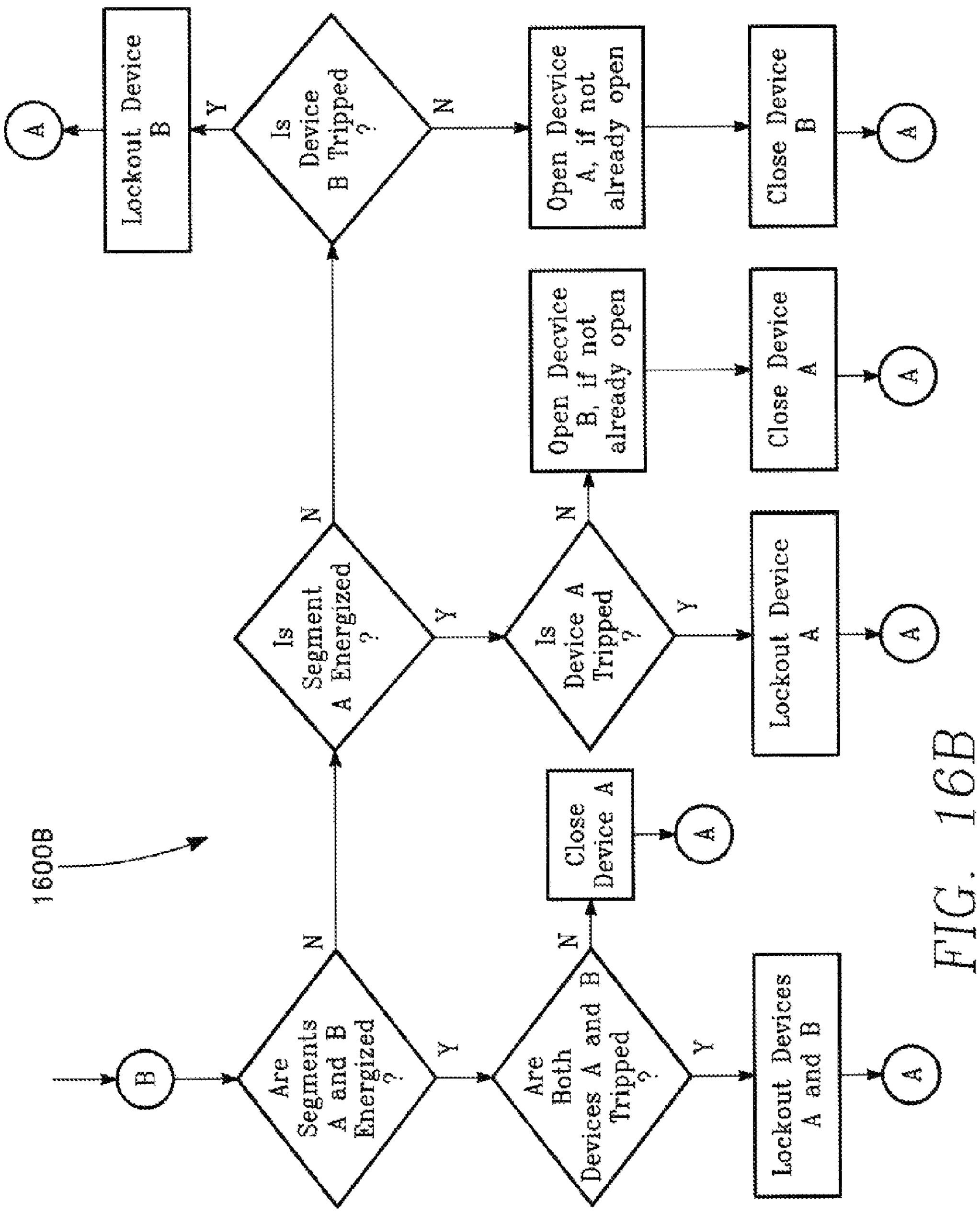

FIGS. 16A, B show distribution control 1600A, B. Distribution control provides for control of switches and/or breakers for segments of a sectionalized loop. A function block closing a switch or breaker may issue a remote command or may send a command to a user to manually operate a switch. For example, depending on whether a particular switch or breaker includes an automated actuator capable of remote control.

In various embodiments, the following terms have the meanings shown:

Device: A device can be a substation breaker or a distribution switch or a way on a larger distribution switch such as on a 5-way S&C Electric Vista Switch.

Energized: The state of a bus or distribution segment can be detected one of several ways: detecting a non-zero voltage on the segment or bus, detecting current or power going to the segment or bus, and detecting current or power coming out of the bus.

Tripped: A protective device is tripped when it has detected a over voltage or an over current fault, its fault interruption coil has been tripped, that is the contacts have be opened due to internal controls detecting a fault Closed: The state of a device where the contacts have been closed, either automatically or manually Open: The state of a device where the contacts have been opened, either automatically or manually Lockout: Lockout is a state where the CEM software will not allow contacts to be closed through remote control of the software. If the contact of the device is currently closed the software will open the contact Next: Checks the next distribution segment in the list or domain of distribution switches Re-Check: Starts the procedure over again for the same distribution segment Coordination commands for islanding are issued by commands 384. Here, breaker, switch, and local generator operation is coordinated to isolate the building, group of buildings, campus, and/or microgrid from external sources of electric power (see command item 12 of FIGS. 3-6).

Figure 17A:
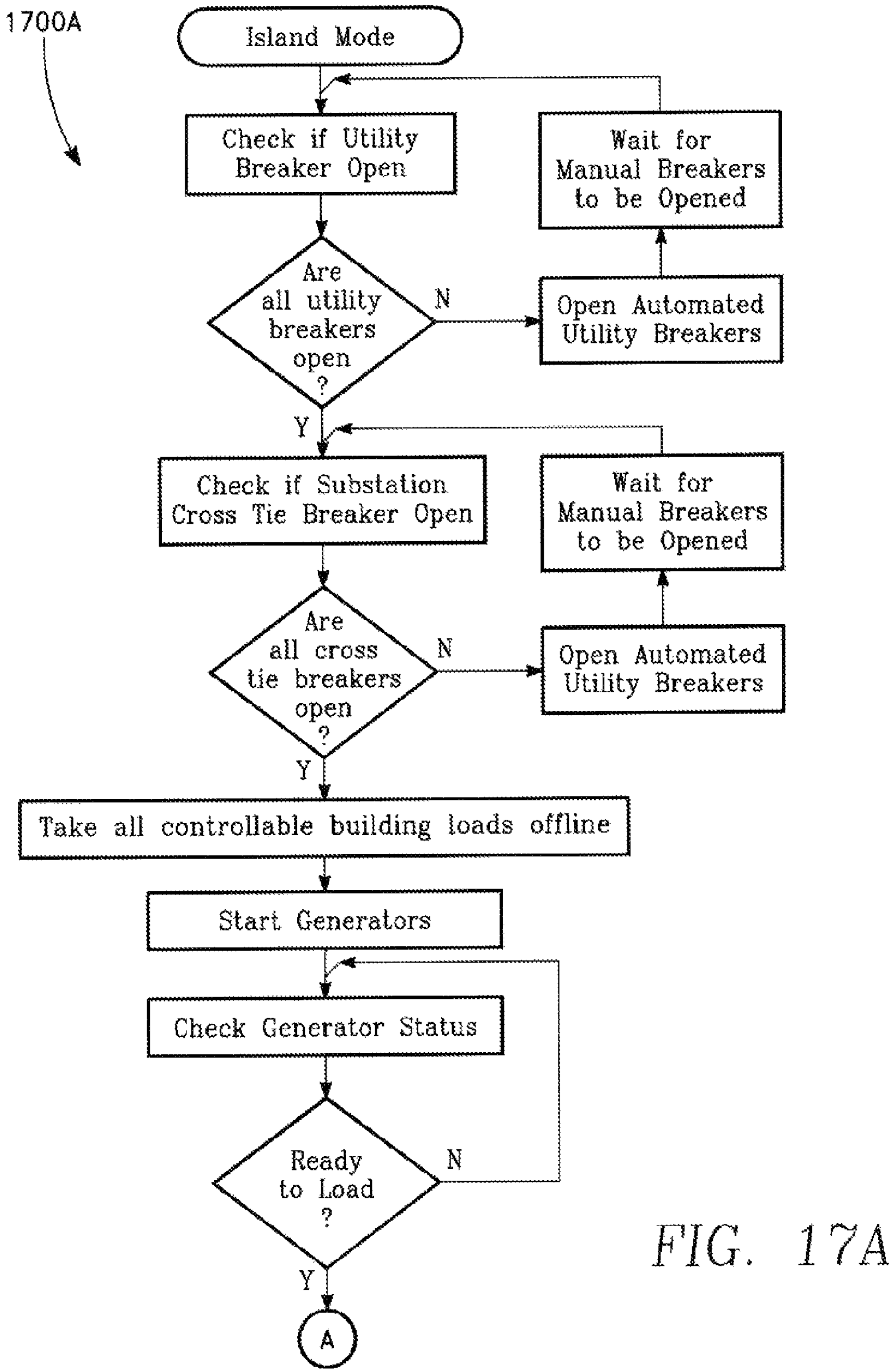
FIGS. 17A, B show a ninth flowchart of operations of the campus energy manager of FIG. 1.
Figure 17B:
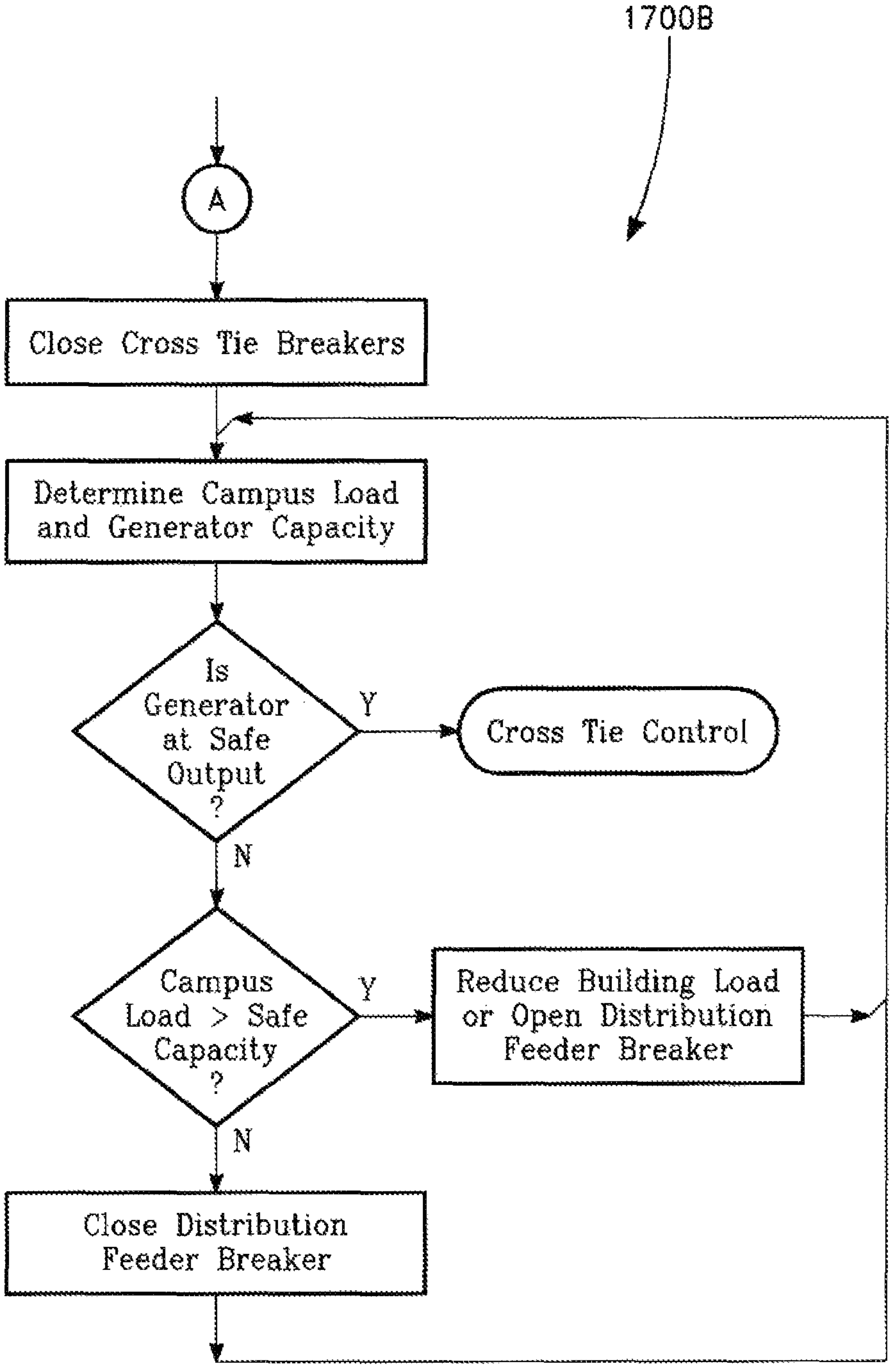

FIGS. 17A, B show an embodiment of island mode control 1700A, B. Where all utility breakers and substation cross tie breakers are open, local generator(s) are dispatched and cross tie breakers are reclosed as generator safe load is maintained. Where generator safe load margin is exceeded or inadequate, building loads are curtailed or distribution feeder breakers are opened.

Reporting 386 carries out functions including reporting and/or tracking 13) energy use, 14) outage metrics and reliability statistics, 15) environmental metrics, and 16) event reports.

Energy use reports are prepared by reports 386. Here, reports include energy use and cost for campus, buildings, groups of buildings, and/or microgrid.

In various embodiments, this function accesses the database 230 and performs calculations, for example in the processor 210, for preparing and delivering these reports. Embodiments of the reports include energy use and cost aggregated to show weekly, monthly, and annual totals.

Outage and reliability reports are prepared by reports 386. Here, reports include outage metrics and reliability statistics for campus, buildings, groups of buildings, and/or microgrid. In various embodiments, this function accesses the database 230 and performs calculations, for example in the processor 210, for preparing and delivering these reports.

In various embodiments, the CEM will determine when an outage occurs by monitoring whether or not a building has power and will accumulate the amount of time the building is without power. These data are used to calculate reliability statistics using IEEE 1366 methods in real time.

Figure 18:
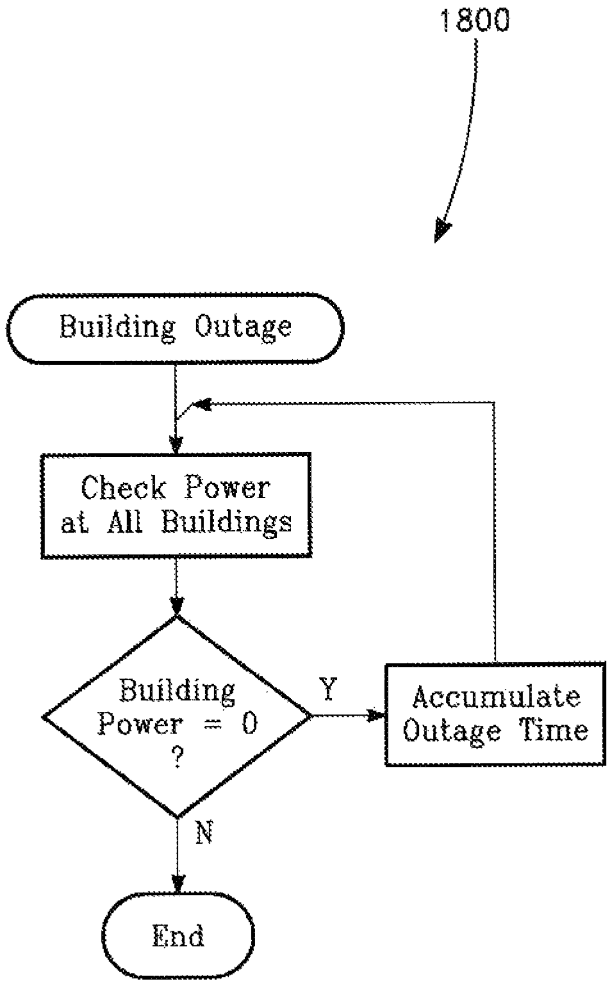
FIG. 18 shows a tenth flowchart of operations of the campus energy manager of FIG. 1.

FIG. 18 shows an embodiment of building outage detection 1800. Building power to all buildings is checked and verified or logged as an outage. Outage time is accumulated for reporting outage metrics.

Environmental reports are prepared by reports 386. Here, reports include environmental performance metrics of campus, buildings, groups of buildings, and/or microgrid. In various embodiments, this function accesses the database 230 and performs calculations, for example in the processor 210, for preparing and delivering these reports. Embodiments of the reports include environmental metrics for weeks, months, and years.

Event reports are prepared by reports 386. Here, reports include event reports for campus, buildings, groups of buildings, and/or microgrid. In some embodiments, events such as disturbances or distribution events are detected in the distribution system and recorded for troubleshooting and documentation purposes. Embodiments save pre-event, event, and post-event data to enhance troubleshooting and/or analysis value of the data. Event triggers include over voltage, under voltage, over current, under current, over frequency, and under frequency on any of the phases in any distribution circuit segment or substation bus. Embodiments of the reports include event reports for hours, days, weeks, months, and years.

Figure 19:
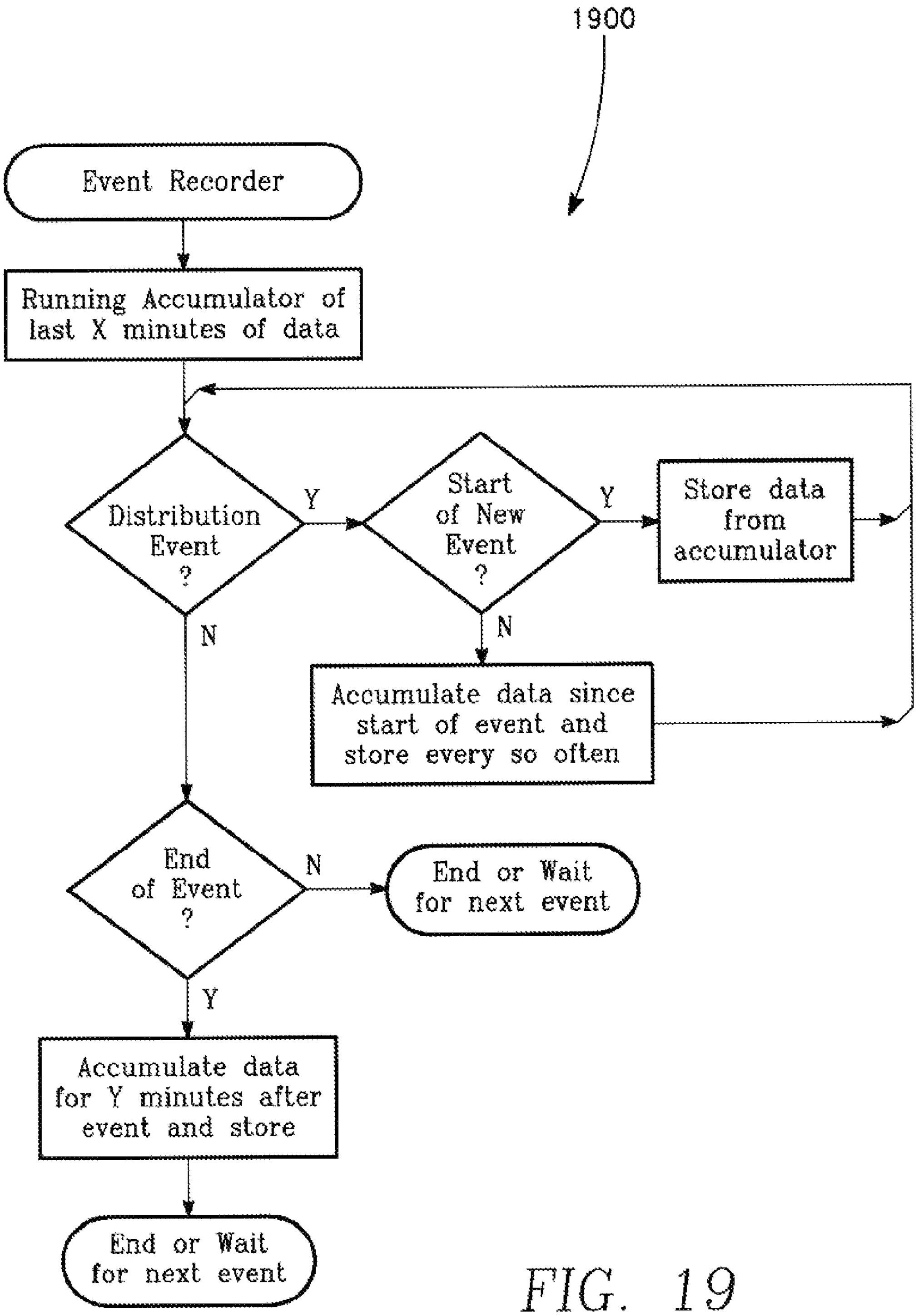
FIG. 19 shows an eleventh flowchart of operations of the campus energy manager of FIG. 1.

FIG. 19 shows an embodiment of an event recorder 1900. Here, distribution events start a running accumulator tracking the last "x" minutes of data. Data collection continues until the end of the event. The resulting data places the event in the context of pre-event and post-event data.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A campus energy management method comprising the steps of:

providing a campus electric power infrastructure including a campus electric power distribution system;

providing an energy manager for managing electrical loads interconnected with the campus electric power infrastructure;

providing field devices interfacing with campus loads and local generating resources;

providing field devices sensing load related environmental variables;

providing energy manager interface modules including bidirectional interface modules for translating field device data into a common format acceptable to the energy manager;

an energy manager processor receiving information from field devices via the interface modules; and, the energy manager processor issuing commands to field devices via the interface modules;

determining from a plurality of operating modes a particular operating mode;

in a demand response operating mode with a requested load reduction RLR, managing by evaluating a potential for building load reduction BLR, if BLR>=RLR then issuing building load reduction command(s), if RLR>BLR then determining if RLR>dispatchable local generation DLG, and if RLR>BLR and if RLR>DLG then issuing building load reduction command(s) and dispatching dispatchable local generation;

in a carbon reduction operating mode with a target carbon reduction TCR, managing by determining $CO_2$ reduction from potential load reduction LCR, and if LCR<TCR then reducing carbon production through load reductions and operation of dispatchable local renewable generation; and in a make or buy operating mode, using indications of make electricity cost M$ and buy electricity cost B$ to dispatch local dispatchable generation where B$>M$ and where this inequality is expected to hold for a time period exceeding a selected minimum local renewable generation run time period.

2. The campus energy management method of claim 1 further comprising the steps of:

making first and second energy consumption forecasts;

making the first energy consumption forecast based on at least data from a baseline year and degree day data;

making the second energy consumption forecast based on at least data from a baseline year and hourly profile data;

comparing first and second energy consumption forecasts; and, utilizing the comparison to determine whether the second energy consumption forecast will be recalculated using an adjusted hourly profile.

3. The campus energy management method of claim 1 further comprising the steps of:

controlling a local uninterruptable power supply electric power source (UPS) by determining a state of charge of the UPS, assessing whether the present time is a utility on-peak time and assessing whether the present time is a utility off-peak time, charging the UPS if the present time is an off-peak time and state of charge is not charged, placing the UPS in a standby mode if the present time is an off-peak time and the state of charge is charged, enabling UPS discharge if the present time is an on-peak time and the UPS state of charge is greater than about twenty percent, and charging the UPS if the present time is an on-peak time and the UPS state of charge is not greater than about twenty percent.

4. The campus energy management method of claim 1 further comprising the steps of:

managing the operation of a renewable generation electric power source (RG) by determining allowable voltage variations at one or more selected locations in the campus electric infrastructure, determining allowable frequency variations at one or more selected locations in the campus electric infrastructure, predicting voltage and frequency variations at respective locations in the campus electric infrastructure while the RG is supplying power to the campus electric power distribution system, assessing whether predicted voltage or frequency variations exceed respective allowable values, and where an exceedance is found, discontinuing a plan to use or current use of the RG.

5. The campus energy management method of claim 1 further comprising the steps of:

implementing a reliable campus electric power supply and distribution system by providing at least first and second utility fed electric power substations as a pair of substations, providing local electric power generation with one or more electric power sources interconnected to a generator bus via respective generator breakers, interconnecting the paired substations with the generator bus via respective substation supply breakers, the generator bus and generator breakers also serving as a substation cross-tie, in each of the paired substations, providing at least first and second utility transformers as respective pairs of transformers, each substation having a substation bus bifurcated by a substation bus tie breaker and forming at least a pair of substation bus segments, each pair of transformers feeding a respective substation bus via respective utility breakers, each of the transformers in a transformer pair being connected to a different substation bus segment, providing electric power supply loops for serving loads, and plural loops interconnecting with each of the substation bus segments, each loop beginning and ending with an interconnection to the same bus segment via a bus segment distribution breaker.

6. The campus energy management method of claim 5 further comprising the step of:

for each of the loops in a plurality of loops, augmenting distribution breakers feeding ends of the loop with loop sectionalization switches such that the loop distribution breakers and sectionalization switches are sufficient to isolate any loop connected load from the related substation bus segment.

7. The campus energy management method of claim 5 further comprising the steps of:

controlling first and second interconnectable substations configured to supply the campus electric power infrastructure by entering an island mode of operation when first and second substation busses are not energized and an adjacent utility feeder supplying the substations is not energized, performing a utility breaker reclosing sequence when a substation bus is not energized and its adjacent utility feeder is not energized, performing a substation crosstie breaker reclosing sequence when a substation bus is not energized, its adjacent utility feeder is not energized, the other substation bus in energized and a substation crosstie breaker is tripped, and opening distribution breakers in the substation and entering a cross tie control mode of operation when a substation bus is not energized, its adjacent utility feeder is not energized, the other substation bus in energized and no crosstie breaker is tripped.

8. The campus energy management method of claim 7 further comprising the steps of:

selectively performing a cross tie control mode of operation by performing a crosstie breaker reclosing sequence if a substation crosstie breaker is tripped, managing crosstie breaker load by a) determining actual breaker load and breaker safe capacity, b) allowing increased crosstie breaker load where actual load is less than the breaker's safe capacity, and c) reducing breaker load where actual load exceeds the breaker's safe capacity, load reduction measures including reducing building load or opening a distribution feeder breaker.

9. The campus energy management method of claim 7 further comprising the steps of:

checking a plurality of distribution circuits, each circuit having a central segment having ends interconnected via respective breakers A and B with peripheral segments A and B by selecting a distribution circuit to check, determining if the central segment is energized and if so returning to selecting a distribution circuit to check while unchecked circuits remain, else determining if segments A and B are energized and if so, checking if breakers A and B are tripped and if so, locking out breakers A and B and returning to selecting a distribution circuit to check else closing breaker A and returning to selecting a distribution circuit to check if not, checking if segment A is energized and if so, checking if breaker A is tripped and if so, locking out breaker A and returning to selecting a distribution circuit to check else opening breaker B if not already open, closing breaker A and returning to selecting a distribution circuit to check else checking if breaker B is tripped and if so, locking out breaker B and returning to selecting a distribution circuit to check else opening breaker A if not already open, closing breaker B, and returning to selecting a distribution circuit to check.

10. The campus energy management method of claim 7 further comprising the steps of:

entering an island mode of operation by opening utility breaker(s) if not already open, opening cross-tie breaker(s) if not already open, starting local generator(s) and waiting for a ready to load state, closing cross tie breaker(s), determining campus load and generator capacity, if generator is at safe output, entering a crosstie operating mode, else if the campus load exceeds the generator safe capacity reducing building load and/or opening a distribution feeder breaker, and returning to determine campus load and generator capacity, and else closing the distribution feeder breaker and returning to determine campus load and generator capacity.

11. The campus energy management method of claim 7 further comprising the steps of:

providing a building outage mode by checking power at all buildings and for each building accumulating time, outage time, when building power is not available.

12. The campus energy management method of claim 7 further comprising the steps of:

providing an event recorder by accumulating data for a trailing time interval, where a distribution event occurred in the time interval and it is the start of a new event, store accumulated data and return to accumulating data, else accumulate data since start of event and store periodically, and where no distribution event occurred in the time interval and an event has ended, end the event else accumulate data for a selected time interval after the event and store the data.

13. A campus energy manager system comprising: an energy manager for managing electrical loads; field devices interfacing with campus loads and local generating resources; field devices sensing load related environmental variables; energy manager interface modules including bidirectional interface modules for translating field device data into a common format acceptable to the energy manager; energy manager processing and storage configured to receive information from field devices via the interface modules; and, energy manager processing and storage configured to issue commands to field devices via the interface modules; determining from a plurality of operating modes a particular operating mode; in a demand response operating mode with a requested load reduction RLR, managing by evaluating a potential for building load reduction BLR, if BLR>=RLR then issuing building load reduction command(s), if RLR>BLR then determining if RLR>dispatchable local generation DLG, and if RLR>BLR and if RLR>DLG then issuing building load reduction command(s) and dispatching dispatchable local generation; in a carbon reduction operating mode with a target carbon reduction TCR, managing by determining CO2 reduction from potential load reduction LCR, and if LCR<TCR then reducing carbon production through load reductions and operation of dispatchable local renewable generation; and, in a make or buy operating mode, using indications of make electricity cost M$ and buy electricity cost B$ to dispatch local dispatchable generation where B$>M$ and where this inequality is expected to hold for a time period exceeding a selected minimum local renewable generation run time period.

14. A campus energy manager system comprising: a campus of buildings and related electric supply infrastructure; systems and devices external to an energy manager; an interface of the energy manager, the interface including a group of interface modules; the interface configured to exchange data between at least some of the systems and devices and the energy manager; the systems and devices including field devices and internet information sources; the interface including field modules and internet services modules; the energy manager including a processing and storage unit; the processing and storage unit configured to provide data storage, data processing, commands, and reporting; wherein the processing and storage unit utilizes the interface to acquire information relating to electric market pricing events, demand response events, and carbon reduction events; and, wherein the processing and storage unit configures the electric infrastructure to respond to at least one of an electric market pricing event, a demand response event, and a carbon reduction event; determining from a plurality of operating modes a particular operating mode; in a demand response operating mode with a requested load reduction RLR, managing by evaluating a potential for building load reduction BLR, if BLR>=RLR then issuing building load reduction command(s), if RLR>BLR then determining if RLR>dispatchable local generation DLG, and if RLR>BLR and if RLR>DLG then issuing building load reduction command(s) and dispatching dispatchable local generation; in a carbon reduction operating mode with a target carbon reduction TCR, managing by determining CO2 reduction from potential load reduction LCR, and if LCR<TCR then reducing carbon production through load reductions and operation of dispatchable local renewable generation; and, in a make or buy operating mode, using indications of make electricity cost M$ and buy electricity cost B$ to dispatch local dispatchable generation where B$>M$ and where this inequality is expected to hold for a time period exceeding a selected minimum local renewable generation run time period.

15. The campus energy manager system of claim 14 further comprising:

a load forecaster for forecasting energy consumption;

an hourly energy consumption profile derived from data from a historical baseline year;

forecast day energy consumption day determined from the hourly forecast;

a difference calculated from forecast day energy consumption and a corresponding energy consumption predicted from degree day adjustments to the baseline year energy data; and, when the difference exceeds a tolerable error value, adjusting the profile to reduce the difference.

16. The campus energy manager system of claim 14 further comprising:

a mode determiner for managing generation;

if a demand response event requiring a load reduction occurs, reduce building loads first and dispatch generators only if building load reduction fails to satisfy the demand response load reduction;

if carbon reduction mode requests a reduction in carbon dioxide production, determine carbon dioxide reduction available from load reduction and dispatch of renewable generation and dispatch low-carbon fossil generation as needed to meet the requested carbon dioxide reduction; and, if a make versus buy mode determination is requested, dispatch generation during a time period where forecasted or actual electricity buy price exceeds a calculated electricity make price.

17. The campus energy manager system of claim 14 further comprising:

a generator minimum economic run period P;

a real-time price evaluation including a real time price model builder and a real time price forecaster;

the real-time price model builder using data from historical three year period including temperature, temperature forecast, real time price, and day ahead price to construct a correlation between real time price and the variables, temperature, temperature forecast, and day ahead pricing; and, a real-time price forecaster comparing a real time price threshold with forecasted real time price and configured to reduce campus load when the threshold is not exceeded for a period longer than P and configured to reduce campus load and to dispatch campus generators when the threshold is equal to or exceeded for a period longer than P.

18. The campus energy manager system of claim 14 further comprising:

a UPS energy storage system having a state of charge and a UPS energy storage control;

a state of charge determination and an expected discharge determination;

the expected discharge determination for one or more coincident periods of peak loads and peak prices based on a load forecast and a price forecast wherein discharge times and discharge rates that tend to maximize cost savings based on stored energy capacity and maximum discharge rate are determined;

a determination of peak times based on expected hourly or 15 minute energy prices;

if not peak time and if charged initiate standby mode or if not peak time and if not charged initiate charge mode;

if peak time and if state of charge is not over twenty percent enter charge mode or if peak time and charge is over twenty percent allow discharge; and, if peak time and if charged allow discharge.

19. The campus energy manager system of claim 14 further comprising:

a renewable generation control for managing renewable generators for managing power quality including one or more of voltage and current variability; and, future curtailment of renewable generation being planned for when an allowed power quality variability specification is not met by a predicted power quality variability.

20. The campus energy manager system of claim 14 further comprising:

redundant substations each having redundant utility connected transformers and each powering plural looped distribution circuits, each end of each loop terminated at a respective distribution circuit breaker;

redundant first and second local generators, each with a generator breaker in series with a respective substation supply breaker;

an intertie connecting between the first generator breakers at one end and connecting between the second generator breakers at the other end; and, wherein the generator breakers and substation supply breakers can be switched to power either or both of the substations from either or both of the generators.

21. The campus energy manager system of claim 14 further comprising:

the first substation having a bifurcated first bus formed by first and second bus segments;

the first and second bus segments interconnected by a normally closed bus tie breaker;

the first bus segment being served by a first utility feed and the second bus segment being served by a second utility feed;

each bus segment feeding a looped distribution circuit via substation distribution breakers at each end of each loop; and, each loop having distribution switches as needed to enable, in combination with loop distribution breakers, isolation of each loop connected load from the substation bus segment powering the loop.

22. The campus energy manager system of claim 21 further comprising:

a segment of the first bus and a second bus of a second substation being interconnected by a cross tie breaker;

a substation control wherein energization of the first bus is checked, if the first bus is energized then return to energization of the first bus is checked else check energization of the first utility feed, if the first utility feed is energized and if a first utility feed breaker can be safely closed then close the breaker and return to energization of the first bus is checked else outage is declared, else if the second bus is energized and if the cross tie breaker is tripped and the cross tie breaker can be safely closed, close the cross tie breaker and return to energization of the first bus segment is checked else declare outage, else enter island mode.

23. The campus energy manager system of claim 21 further comprising:

a second substation cross tied with the first substation via a crosstie breaker;

a crosstie control wherein first and second substations are selectively interconnected, crosstie breaker status is checked, if the crosstie breaker is tripped, the breaker is closed and if safely reclosed return to crosstie breaker status is checked else enter outage, if crosstie breaker load exceeds safe capacity reduce building load or open a distribution feeder breaker, and if crosstie breaker load does not exceed safe capacity, close distribution feeder breaker if it is not tripped.

24. The campus energy manager of claim 21 further comprising:

line segments interposed between respective pairs of end switches;

means for energizing a de-energized line segment;

means for isolating a de-energized line segment; and, means for determining whether a particular de-energized line segment will be energized or isolated.

25. The campus energy manager of claim 21 further comprising:

an island mode control wherein closed utility breakers are opened, substation cross-tie breaker(s) are opened, controllable building loads are shed, a generator is started, the substation cross-tie breaker is closed, campus load and generator capacity are determined, and if the generator is operating in a safe range cross tie control begins, else check if campus load exceeds generator capacity and if so reduce building load or open a distribution feeder breaker and return to campus load and generator capacity are determined.

26. The campus energy manager of claim 21 further comprising:

a building outage recorder system including a recorder wherein building power is checked, where there is a building power outage the recorder accumulates outage time for that building, and when the building power outage ends return to building power is checked.

27. The campus energy manager of claim 21 further comprising:

an event recorder with an accumulator for accumulating data during a trailing time period wherein the event recorder monitors distribution events, if a distribution event is the start of a new event, store data from the accumulator and return to the event recorder monitors distribution events, if a distribution event is not the start of a new event, accumulate data since the start of the event and store periodically, then return to the event recorder monitors distribution events, and accumulate data during an ending time period encompassing the time the distribution event ends and store.

* * * * *